(12) United States Patent
Shiba et al.

(10) Patent No.: US 7,765,334 B2
(45) Date of Patent: Jul. 27, 2010

(54) ELECTRONIC APPARATUS FOR USE WITH REMOVABLE STORAGE MEDIUM, CONTROL METHOD THEREFOR, AND PROGRAM FOR IMPLEMENTING THE METHOD

(75) Inventors: Hidenori Shiba, Tokyo (JP); Shozo Endo, Kawasaki (JP); Shinji Kurokawa, Yokohama (JP); Tadashi Koyama, Kawasaki (JP)

(73) Assignee: Canon Kabushiki Kaisha (JP)

( * ) Notice: Subject to any disclaimer, the term of this patent is extended or adjusted under 35 U.S.C. 154(b) by 457 days.

(21) Appl. No.: 11/125,306

(22) Filed: May 9, 2005

(65) Prior Publication Data

US 2005/0268127 A1 Dec. 1, 2005

(30) Foreign Application Priority Data

May 12, 2004 (JP) .............................. 2004-142322
May 28, 2004 (JP) .............................. 2004-160147

(51) Int. Cl.
*G06F 3/00* (2006.01)
*G06F 1/00* (2006.01)

(52) U.S. Cl. ............................. 710/15; 710/18; 710/19; 713/100; 713/320; 713/324; 711/115

(58) Field of Classification Search ................. 711/115; 710/15, 18, 19; 713/100, 320, 324
See application file for complete search history.

(56) References Cited

U.S. PATENT DOCUMENTS

| | | | | |
|---|---|---|---|---|
| 5,251,295 A | * | 10/1993 | Ikenoue et al. | ............... 345/504 |
| 5,507,000 A | * | 4/1996 | Stewart et al. | ................ 712/34 |
| 5,590,376 A | * | 12/1996 | Kou | ............. 710/19 |
| 5,638,540 A | * | 6/1997 | Aldous | ....................... 713/300 |
| 5,877,975 A | * | 3/1999 | Jigour et al. | ................... 365/52 |
| 5,909,565 A | * | 6/1999 | Morikawa et al. | ........... 712/200 |
| 6,118,929 A | * | 9/2000 | Kawamura et al. | .......... 386/117 |
| 6,295,569 B1 | * | 9/2001 | Shimura et al. | ............. 710/305 |

(Continued)

FOREIGN PATENT DOCUMENTS

JP 05012131 A * 1/1993

(Continued)

OTHER PUBLICATIONS

'Embedded Microprocessor Systems Design: An Introduction Using the Intel 80C188EB' by Short, Prentice Hall, 1998.*

*Primary Examiner*—Henry W. H. Tsai
*Assistant Examiner*—Steven G Snyder
(74) *Attorney, Agent, or Firm*—Rossi, Kimms & McDowell LLP

(57) ABSTRACT

An electronic apparatus which makes it possible to reduce start-up time for starting the electronic apparatus, without necessitating installment of a plurality of CPUs in the electronic apparatus. A main CPU 45 controls a digital camera implementing the electronic apparatus. A storage medium for storing information can be detachably attached to a connector 97. A medium detection circuit 85 monitors a status of attachment and detachment of the storage medium to and from the digital camera, irrespective of a status of operation of the main CPU 45. The sensed status of attachment and detachment of the storage medium is stored in a register 115 of the medium detection circuit 85.

12 Claims, 27 Drawing Sheets

U.S. PATENT DOCUMENTS

| | | | |
|---|---|---|---|
| 6,473,569 B1* | 10/2002 | Shidate et al. | 396/280 |
| 6,868,465 B2* | 3/2005 | Witt, Jr. | 710/104 |
| 2002/0178307 A1* | 11/2002 | Pua et al. | 710/62 |
| 2003/0218386 A1* | 11/2003 | Dalke et al. | 307/80 |
| 2004/0212693 A1* | 10/2004 | Wakabayashi | 348/231.1 |
| 2004/0227521 A1* | 11/2004 | Higashihama et al. | 324/522 |
| 2005/0021920 A1* | 1/2005 | Cornelius et al. | 711/167 |
| 2005/0193170 A1* | 9/2005 | Endo | 711/115 |
| 2006/0171683 A1* | 8/2006 | Battaglia et al. | 386/107 |

FOREIGN PATENT DOCUMENTS

| | | | |
|---|---|---|---|
| JP | 2001223937 A | * | 8/2001 |
| JP | 2002-150230 A | | 5/2002 |
| JP | 2002-237977 A | | 8/2002 |

* cited by examiner

ELECTRONIC APPARATUS FOR USE WITH REMOVABLE STORAGE MEDIUM, CONTROL METHOD THEREFOR, AND PROGRAM FOR IMPLEMENTING THE METHOD

BACKGROUND OF THE INVENTION

1. Field of the Invention

The present invention relates to an electronic apparatus, such as an image pickup apparatus, for use with a removable storage medium, and a control method therefor, which are capable of reducing start-up time, and a program for implementing the method.

2. Description of the Related Art

Conventionally, there have been proposed electronic apparatuses in which a storage medium storing information can be removably mounted. In the following, a description will be given of an electronic apparatus of this kind by taking a portable digital camera as an example.

FIG. 27 is a block diagram showing the configuration of the conventional digital camera.

In FIG. 27, a RTC (Real Time Clock) 287 is a clock management device that manages time within a sub CPU 201 and the digital camera. Electric power is constantly supplied to the RTC 287 from a power supply 289. The sub CPU 201 is implemented by a low power consumption type. Connected to the sub CPU 201 are a RAM 205 for use by the sub CPU 201, a ROM 203 storing programs executed by the sub CPU 201, and an operation system 209 including a mode dial for use in designating an operation mode of the digital camera and various kinds of buttons. Further, a storage medium 271 implemented e.g. by a compact flash (registered trademark) for storing picked-up images is connected to the sub CPU 201, and a signal indicative of the status of attachment/detachment of the storage medium 271 is input to the sub CPU 201. The sub CPU 201 constantly monitors a signal indicative of the status of operation of the operation system 209 and the signal indicative of the status of attachment/detachment of the storage medium 271.

Further, the sub CPU 201 is connected to a power supply controller 281 to control electric power to be supplied to the overall system of the digital camera. Based on the monitored status of operation of the operation system 209, the sub CPU 201 determines whether an input instruction is for turning on the power supply 289 or for turning off the same, and then causes the power supply controller 281 to turn on or off the power supply 289. The power supply controller 281 is connected to the power supply 289 to extract voltages required for respective components of the digital camera from the voltage of the power supply 289 and then supply each of the voltages to a corresponding component. ON/OFF control of electric power supplied to each component is performed by the sub CPU 201.

A main CPU 245 has connected thereto a ROM 207 which stores programs according to which the main CPU 245 operates. The main CPU 245 reads out the programs from the ROM 207 and activates the same. Further, the main CPU 245 has connected thereto a RAM 217 which is a work memory for temporarily storing photographed image data and data necessary for operation of the main CPU 245.

Also connected to the main CPU 245 are a lens driver 219, an image pickup section 221 comprised of an image pickup device and a timing generator, an image display section 259 comprised of a LCD, and the storage medium 271. The lens driver 219, the image pickup section 221, the image display section 259, and the storage medium 271 are controlled by the main CPU 245 to perform intended processes. The sub CPU 201 and the main CPU 245 are connected to each other by communication means so as to detect each other's status. The main CPU 245 detects the status of operation of the operation system 209 using the communication means, determines an operation mode, such as a photographing mode or a playback mode, and carries out processing corresponding to the sensed operation mode.

Further, the main CPU 245 monitors the status of operation of the operation system 209 and the status of attachment/detachment of the storage medium 271 via the sub CPU 201. When an instruction for turning off the power is given via the operation system 209 in a state where the storage medium 271 is mounted, the main CPU 245 carries out processing for saving information of the file system and the like of the storage medium 271 in the RAM 217 and then executes a power-off process. Upon completion of the power-off process, the main CPU 245 notifies the sub CPU 201 of the completion.

When notified of the completion of the power-off process by the main CPU 245, the sub CPU 201 causes the power supply controller 281 to stop supply of electric power to the system of the digital camera. Even in the power-off state, the sub CPU 201 retains the history of the status of operation of the operation system 209 and that of the attachment/detachment of the storage medium 271. When a power-on operation is subsequently performed via the operation system 209, the sub CPU 201 turns on the power supply 289 via the power supply controller 281. As a result, electric power is supplied to the main CPU 245 to start up the same. When the storage medium 271 has remained mounted without being removed during the power-off state, the main CPU 245 reads out the information of the file system and the like of the storage medium 271, which has been saved in the RAM 217. Thus, time required for initialization of the storage medium 271 can be reduced. It is to be understood that when the storage medium 271 was removed and the same storage medium or a different one 271 was mounted during the power-off state, the mounted storage medium 271 is initialized.

The technique in which a sub CPU controls a power supply to manage electric power supplied to the overall system of a digital camera as described above has also been proposed e.g. in Japanese Laid-Open Patent Publication (Kokai) No. 2002-237977.

However, it is necessary for an electronic apparatus of the above-described type, which is configured to constantly monitor the status of attachment/detachment of a storage medium, to incorporate not only a first CPU for controlling the overall operation of the apparatus, but also a second CPU (sub CPU) constantly supplied with electric power. This increases the member of component parts to complicate the circuit configuration of the apparatus and makes the apparatus expensive.

Further, recent electronic apparatuses have been more and more miniaturized, and accordingly each electronic apparatus tends to have a reduced device mounting area therein. This makes it difficult for such a miniaturized electronic apparatus to secure an area for mounting the second CPU in addition to the first CPU.

Furthermore, even when the main power supply of the electronic apparatus is off, it is necessary to constantly supply electric power to the CPU for monitoring the status of attachment/detachment of a storage medium. This increases power consumption, and if the electronic apparatus uses a battery as its power supply, the service life of the battery is shortened.

To overcome this problem, recently, low power consumption CPUs have been developed. Nevertheless, the amount of electric power required for driving the low power consumption CPUs is larger than that of electric power consumed by low power consumption devices, such as a RTC. Therefore, electronic apparatuses having incorporated therein a low power consumption CPU which is always driven in the power-off status of the apparatuses consume a larger amount of electric power than apparatuses without a CPU being always driven.

On the other hand, to give top priority to reduction of power consumption and extension of the service life of the battery, if monitoring of the status of attachment/detachment of the storage medium is stopped when the main power supply of the electronic apparatus is off, it is necessary to acquire information of the storage medium whenever the apparatus is started up, which causes an increase in start-up time. In general, with an increase in the capacity of a storage medium, time necessary for initialization increases. In recent years, the increase in the capacity of storage media has been marked, and this trend will continue undoubtedly. Therefore, it can be easily foreseen that start-up time will be more and more increased.

Further, even when the main power supply of the electronic apparatus is off, the status of attachment/detachment of the storage medium is monitored by the monitoring CPU supplied with electric power from an auxiliary power supply to detect whether or not the storage medium has been removed from the apparatus. However, if the electronic apparatus is brought into a state where the monitoring CPU cannot be supplied with electric power from either the main power supply or the auxiliary power supply, the status of attachment/detachment of the storage medium cannot be monitored from then on. If the storage medium is removed under this situation, this can cause wrong attachment/detachment history information indicative of the status of attachment/detachment of the storage medium. To avoid this, the attachment/detachment history information of the storage medium has to be checked whenever the electronic apparatus is started up.

SUMMARY OF THE INVENTION

It is a first object of the present invention to provide an electronic apparatus and a control method therefor, which make it possible to reduce start-up time for starting up the electronic apparatus, without necessitating installment of a plurality of CPUs in the electronic apparatus, and a program for implementing the method.

It is a second object of the present invention to provide an electronic apparatus and a control method therefor, which make it possible to reduce power consumption, and a program for implementing the method.

It is a third object of the present invention to provide an electronic apparatus and a control method therefor, which make it possible to simplify the circuit configuration of the electronic apparatus, and a program for implementing the method.

To attain the above first to third objects, in a first aspect of the present invention, there is provided an electronic apparatus comprising a control device that controls the electronic apparatus, a connection device that is capable of detachably attaching a storage medium for storing information to the electronic apparatus, a monitoring device that monitors a status of attachment and detachment of the storage medium to and from the electronic apparatus irrespective of a status of operation of the control device, and a monitoring result storage device that stores a result of monitoring by the monitoring device.

With the configuration of the first aspect of the present invention, the status of attachment and detachment of the storage medium to and from he electronic apparatus is monitored irrespective of the status of operation of the control device, the detected status of attachment/detachment of the storage medium is stored as a monitoring result, and the control device accesses the monitoring result stored in the monitoring result storage device, when the control device carries out the start-up process. According to this aspect of the present invention, the necessity to provide a second CPU in the electronic apparatus in addition to a first CPU (control device) for controlling the overall operation of the electronic apparatus, as in the conventional electronic apparatus, can be obviated, which makes it possible to simplify the circuit configuration of the digital camera, thereby reducing the cost of the same.

Further, since the status of attachment/detachment of the storage medium is monitored by the monitoring device, irrespective of the status of operation of the control means, or in other words, in the power-off state of the electronic apparatus, it is possible to reduce power consumption in monitoring of the status of attachment/detachment of the storage medium.

Preferably, the electronic apparatus comprises a communication device that enables the control device to access the monitoring result stored in the monitoring result storage device, when the control device carries out a start-up process.

With the configuration of this preferred embodiment, in the start-up process, the control device can access the monitoring result storage means via the communication device and read out the detected status of attachment/detachment of the storage medium. As a result, it is possible to start up the electronic apparatus without initializing the storage medium, which enables reduction of start-up time.

Preferably, the electronic apparatus comprises a time management device that manages time within the electronic apparatus, and the monitoring device, the monitoring result storage device, and the time management device are configured as a single device.

Preferably, the electronic apparatus comprises a management information storage device that stores file management information from the storage medium, and when the control device determines, based on the monitoring result stored in the monitoring result storage device, that the storage medium has not been detached from the electronic apparatus, the control device reads out the file management information from the management information storage device to carry out a start-up process, whereas when the control device determines that the storage medium was detached from the electronic apparatus at least once, the control device reads out the file management information from the storage medium to carry out the start-up process.

Preferably, the monitoring device monitors the status of attachment and detachment of the storage medium at predetermined time intervals.

More preferably, the control device sets time intervals at which the monitoring device monitors the status of attachment and detachment of the storage medium, via the communication device.

Preferably, the electronic apparatus comprises a determination device that determines time intervals at which the monitoring device monitors the status of attachment and detachment of the storage medium, based on the monitoring result stored in the monitoring result storage device.

Preferably, the monitoring device stops monitoring the status of attachment and detachment of the storage medium after the storage medium is detached from the electronic apparatus.

Preferably, the electronic apparatus comprises a management information storage device that stores file management information from the storage medium, a time management device that manages time within the electronic apparatus, and a plurality of signal lines connecting between the control device and the monitoring device and the time management device, and when the control device determines, based on the monitoring result stored in the management information storage device, that the storage medium has not been detached from the electronic apparatus, the control device reads out the file management information from the management information storage device to carry out a start-up process, whereas when the control device determines that the storage medium was detached from the electronic apparatus at least once, the control device reads out file management information from the storage medium to carry out the start-up process.

More preferably, the signal lines are at least partially formed by a common signal line.

With the configurations of these preferred embodiments, the signal lines connecting between the control device and the monitoring device and the time management device are configured to be at least partially formed by a common signal line. Further, the status of attachment/detachment of the storage medium is monitored by the monitoring device, irrespective of the status of operation of the control device, with reduced power consumption. Furthermore, when the control device determines, based on the monitoring result, that the storage medium has not been detached from the electronic apparatus, the control device reads out the file management information from the management information storage device and carries out the start-up process, whereas when the control device determines that the storage medium was detached from the electronic apparatus at least once, the control device reads out file management information from the storage medium and carries out the start-up process. This makes it possible to obviate the necessity to provide a plurality of CPUs in the electronic apparatus, as in the conventional electronic apparatus. Further, since the signal lines are at least partially formed by a common line, the circuit configuration of the electronic apparatus can be simplified. Moreover, it is not necessary to check the attachment/detachment history information of the storage medium whenever the electronic apparatus is started up, as in the conventional digital camera, which makes it possible to reduce start-up time.

More preferably, the signal lines are independent of each other.

More preferably, the time management device has the monitoring device incorporated therein, and the time management device has a storage device that also functions as the monitoring result storage device.

More preferably, the electronic apparatus comprises a prevention device connected between the control device and the connection device, for preventing electric current from flowing into the control device when the control device is in a power supply-stopped state.

More preferably, the electronic apparatus comprises a voltage setting device that sets an operation stop voltage for the monitoring device to a higher level than an operation stop voltage for the time management device when priority is given to the time management of the time management device, and sets the operation stop voltage for the time management device to a higher level than the operation stop voltage for the monitoring device when priority is given to the monitoring of the monitoring device.

Preferably, the electronic apparatus comprises a fixing device that fixes information stored in the monitoring result storage device to information indicative of detachment of the storage medium from the electronic apparatus irrespective of whether or not the storage medium is attached to or detached from the electronic apparatus, when a predetermined condition is satisfied, and the control device carries out a start-up process based on the fixed information.

More preferably, the predetermined condition includes at least one of a condition that a voltage supplied to the monitoring device has become equal to or lower than a set voltage and a condition that a reset signal has been externally input to the monitoring device.

More preferably, the monitoring result storage device stores the information indicative of detachment of the storage medium from the electronic apparatus as the monitoring result.

Preferably, the electronic apparatus comprises a first conversion device that converts a voltage from a first power supply capable of supplying electric power to components of the electronic apparatus to a first voltage, a second conversion device that converts a voltage from a second power supply capable of supplying electric power to the monitoring device and the monitoring result storage device to a second voltage, and a switching device that selectively switches between the first voltage and the second voltage to supply a selected one of the first voltage and the second voltage to the monitoring device and the monitoring result storage device.

More preferably, the switching device carries out at least one of a control operation for supplying a higher one of the first voltage and the second voltage, and a control operation for preferentially supplying the first voltage.

More preferably, the electronic apparatus comprises a charging device that causes the first power supply to charge the second power supply.

More preferably, the electronic apparatus comprises a time management device that manages time within the electronic apparatus, and the monitoring device, the monitoring result storage device, and the time management device are operated by common electric power supplied from one of the first power supply and the second power supply.

Preferably, the electronic apparatus is applicable to image pickup apparatuses including a digital camera.

To attain the above first to third objects, in a second aspect of the present invention, there is provided a method of controlling an electronic apparatus comprising a control device that controls the electronic apparatus, a connection device that is capable of detachably attaching a storage medium for storing information to the electronic apparatus, and a monitoring device that monitors a status of attachment and detachment of the storage medium to and from the electronic apparatus irrespective of a status of operation of the control device, comprising an acquisition step of acquiring a result of monitoring by the monitoring device.

Preferably, the control method comprises a storage step of storing the acquired monitoring result, and a communication step of enabling the control device to access the stored monitoring result when carrying out a start-up process.

Preferably, the electronic apparatus comprises a time management device that manages time within the electronic apparatus, and a plurality of signal lines connecting between the control device and the monitoring device and the time management device, and the signal lines are at least partially formed by a common signal line, the control method comprising a determination step of determining, based on the acquired monitoring result, whether or not the storage medium has not been detached from the electronic apparatus, when the control device carries out a start-up process, and a start-up step of reading out file management information and carrying out the start-up process by the control device, wherein in the start-up step, when it is determined in the determination step that the storage medium has not been detached from the electronic apparatus, the file management information of the storage medium is read out from a management information storage device that stores the file management information and the start-up process is carried out, whereas when it is determined in the determination step that the storage medium was detached from the electronic apparatus, file management information is read out from the storage medium and the start-up process is carried out.

To attain the above first to third objects, in a third aspect of the present invention, there is provided a program for causing a computer to execute a method of controlling an electronic apparatus comprising a control device that controls the electronic apparatus, a connection device that is capable of detachably attaching a storage medium for storing information to the electronic apparatus, and a monitoring device that monitors a status of attachment and detachment of the storage medium to and from the electronic apparatus irrespective of a status of operation of the control device, comprising an acquisition module for acquiring a result of monitoring by the monitoring device.

Preferably, the program comprises a storage module for storing the acquired monitoring result, and a communication module for enabling the control device to access the stored monitoring result when carrying out a start-up process.

Preferably, the electronic apparatus comprises a time management device that manages time within the electronic apparatus, and a plurality of signal lines connecting between the control device and the monitoring device and the time management device, and the signal lines are at least partially formed by a common signal line, the program comprising a determination module for determining, based on the acquired monitoring result, whether or not the storage medium has not been detached from the electronic apparatus, when the control device carries out the start-up process, and a start-up module for reading out predetermined file management information and carrying out the start-up process by the control device, and when the determination module determines that the storage medium has not been detached from the electronic apparatus, the start-up module reads out the file management information of the storage medium from a management information storage device that stores the file management information to carry out the start-up process, whereas when the determination module determines that the storage medium was detached from the electronic apparatus at least once, the start-up module reads out file management information from the storage medium to carry out the start-up process.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the drawings showing preferred embodiments thereof.

Figure 1A:
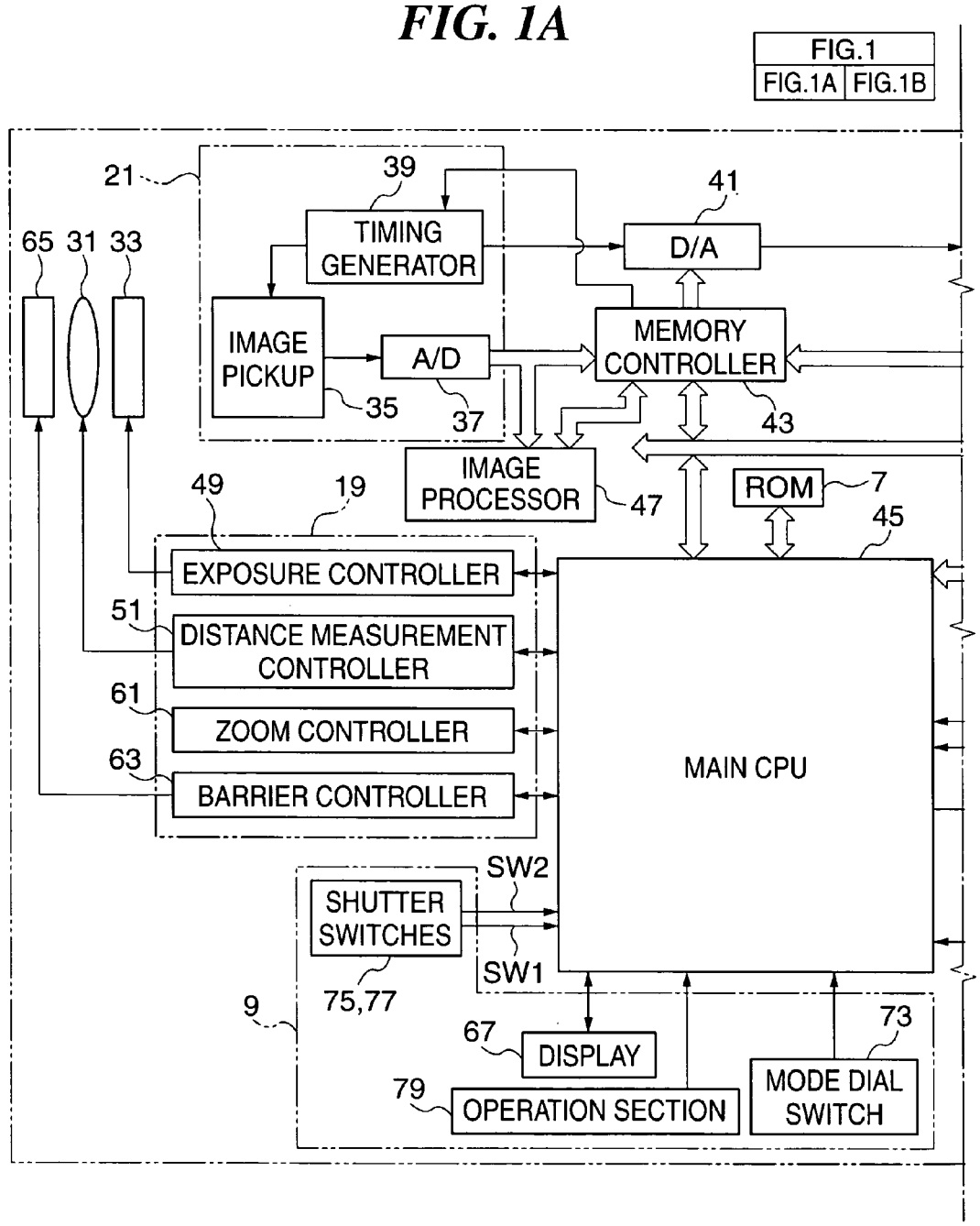
FIGS. 1A and 1B are block diagrams showing the configuration of a digital camera as an electronic apparatus according to a first embodiment of the present invention.
Figure 1B:
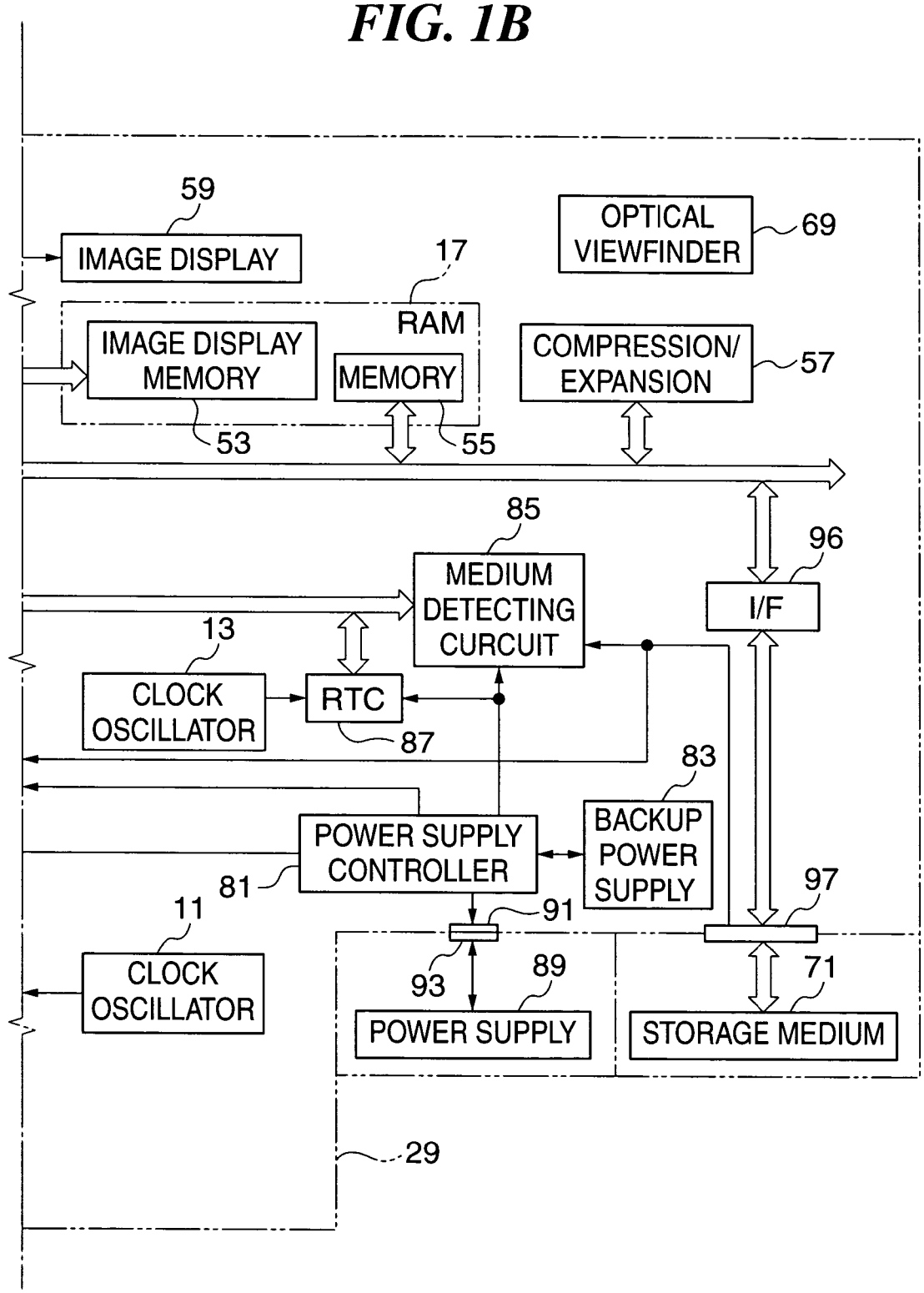

FIGS. 1A and 1B are block diagrams showing the configuration of a digital camera as an electronic apparatus according to a first embodiment of the present invention.

As shown in FIGS. 1A and 1B, a portable digital camera as an electronic apparatus has a main unit 29 comprised of a photographing lens 31, a shutter 33, an image pickup device 35, a main CPU 45, an optical viewfinder 69, and a medium detecting circuits 85. The main unit 29 is configured to have a storage medium 71 removably attached thereto. The photographing lens 31, the shutter 33, and the image pickup device 35 form an image pickup section.

The photographing lens 31 captures an optical image of an object image. A barrier 65 is a protective device that covers the image pickup section to protect the same from dirt and damage. The shutter 33 is provided with a diaphragm function. The image pickup device 35 converts the optical image to electric signals. An A/D converter 37 converts the analog signals output from the image pickup device 35 into digital signals. A timing generator circuit 39 supplies clock signals and control signals to the image pickup device 35, the A/D converter 37, and a D/A converter 41, and is controlled by a memory control circuit 43 and a main CPU 45. The timing generator circuit 39, the image pickup device 35, and the A/D converter-37 form a signal processing system 21 of the image pickup section.

An image processing circuit 47 performs predetermined pixel interpolation and color conversion on image data output from the A/D converter 37 or the memory control circuit 43, and carries out predetermined computations using picked-up image data. The main CPU 45 executes AF (automatic focusing) processing, AE (automatic exposure) processing, and EF (electronic flash pre-flashing) processing for an exposure controller 49 and a ranging controller 51, based on computations performed by the image processing circuit 47. Further, the image processing circuit 47 performs AWB (automatic white balance) processing based on predetermined computation processing.

The memory control circuit 43 controls the A/D converter 37, the timing generator circuit 39, the image processing circuit 47, an image display memory 53, the D/A converter 41, a memory 55, and a compression and expansion circuit 57. The image display memory 53 and the memory 55 are implemented by a single RAM 17 such that a predetermined area thereof is allocated to the image display memory 53 and another predetermined area to the memory 55. The image data converted to the digital signal by the A/D converter 37 is written into the image display memory 53 or the memory 55 via both the image processing circuit 47 and the memory control circuit 43 or via the memory control circuit 43 alone.

The image data written into the image display memory 53 for display is displayed by an image display section 59 comprised of a LCD, via the D/A converter 41. The image display section 59 sequentially displays picked-up image data to thereby realize an electronic finder function. The image display section 59 is capable of selectively turning on or off the display in response to an instruction from the main CPU 45. When the display is turned off, power consumption by the digital camera can be considerably reduced.

The memory 55 stores picked-up still images and moving images, and has a sufficiently large storage capacity for storing a predetermined number of still images and a moving image recorded for a predetermined time period. This large storage capacity enables high-speed writing of a large amount of image data into the memory 55 in continuous shooting and panorama shooting, in which a plurality of still images are consecutively photographed. Further, the memory 55 can also be used as a work area for the main CPU 45. The compression and expansion circuit 57 compresses and expands image data. The compression and expansion circuit 57 reads image data stored in the memory 55 and compresses or expands the image data, followed by writing the processed image data in the memory 55.

The exposure controller 49 controls the shutter 33. The ranging controller 51 controls a focusing operation by the photographing lens 31. A zoom controller 61 controls a zooming operation by the photographing lens 31. A barrier controller 63 controls an operation of the barrier 65. Based on computations of picked-up image data by the image processing circuit 47, the main CPU 45 controls the exposure controller 49 and the ranging controller 51. The exposure controller 49, the ranging controller 51, the zoom controller 61, and the barrier controller 63 form a control system 19 for the image pickup section and the barrier 65.

The main CPU 45 controls the digital camera. More specifically, the main CPU 45 controls electric power supplied to components of the digital camera from a power supply 89 and a backup power supply 83 via a power supply controller 81, detects inputs by operated ones of operating keys of an operating section 79, and controls the overall operation of the digital camera based on the inputs by the operated keys. Further, the main CPU 45 executes a start-up process, described in detail hereinafter with reference to a flowchart shown in FIG. 9, according to a program stored in the ROM 7.

A display section 67 displays the status of operation of the digital camera and messages using characters, images, voices, and so forth, in accordance with execution of programs by the main CPU 45. The display section 67 is comprised of a single unit or a plurality of units disposed at a single location or at respective locations close to the operating section 79 where it is easily viewable. The display section 67 is implemented e.g. by a combination of an LCD, LEDs, sounding elements, and so forth. Further, an element or device realizing part of the function of the display section 67 is disposed in the optical viewfinder 69.

Among the contents to be displayed by the display section 67, selection of a single-shot mode or a continuous shooting mode, a self-timer mode, a compression ratio, the number of pixels for recording, the number of taken photographs, the number of photographs to be taken, a shutter speed, a diaphragm value, the setting of exposure correction, flash setting, the use of the red-eye reducing function, a macro shooting mode, buzzer setting, the remaining charge of a battery for a clock, the remaining charge of the other batteries, an error, information represented by a plurality of digits, the status of attachment or detachment of the storage medium 71, an operative status of the communication I/F, the date/time, etc. are displayed on the LCD or the like. Further, of the contents to be displayed by the display section 67, in-focus, shake warning, flash charging, the shutter speed, the diaphragm value, and the setting of exposure correction, etc. are displayed inside the optical view finder 69.

A mode dial switch 73, a first shutter switch 75 (SW1), a second shutter switch 77 (SW2), and the operating section 79 are used for inputting various instructions to the digital camera, and each formed by one or a combination of two or more of a switch, a dial, a touch panel, an eye gaze direction detection-based pointing device, a voice recognition mechanism, and so forth. The mode dial switch 73, the first shutter switch 75, the second shutter switch 77, and the operating section 79 form an operation system 9 together with the display section 67.

The mode dial switch 73 is capable of selectively setting one of various functional (operation) modes, such as a power-off mode, an automatic shooting mode, a photographing mode, a panorama shooting mode, a reproduction mode, a multi-screen reproduction and deletion mode, and a PC connection mode.

The first shutter switch 75 is turned on when a shutter button, not shown, is half pressed, to provide an instruction for starting execution of the AF processing, the AE processing, the EF processing, and so forth. The second shutter switch 77 is turned on when the shutter button, not shown, is fully pressed, to provide an instruction for starting execution of a series of processes, i.e. an exposure process in which the signal read from the image pickup device 35 is written as image data into the memory 55 via the A/D converter 37 and the memory control circuit 43, a development process carried out using computations by the image processing circuit 47 and the memory control circuit 43, and a recording process in which the image data is read out from the memory 55, compressed by the compression and expansion circuit 57, and written into the storage medium 71.

The operating section 79 is provided with a menu button, a set button, a macro button, a multi-screen reproduction and page button, a flash setting button, a single shooting/continuous shooting/self-timer mode-switching button, a menu moving +(plus) button, a menu moving −(minus) button, a reproduced image moving +(plus) button, a reproduced image moving −(minus) button, a shooting image quality selection button, an exposure correction setting button, and a data/time setting button.

The power supply controller 81 is comprised of a battery detecting circuit, a DC-to-DC converter, and a switching circuit for switching supply of electric power between blocks. The power supply controller 81 supplies a necessary voltage to each component just over a required time period, under the control by the main CPU 45. FIGS. 1A and 1B show only lines through which electric power is supplied to the main CPU 45, the medium detecting circuit 85, and a RTC (Real Time Clock) 87, described hereinafter, but needless to say, electric power is also supplied to other components.

The backup power supply 83 is implemented by a primary battery, such as a coin battery, or a secondary battery for use in a supercomputer or the like. When there is no power supply from the power supply 89, the backup power supply 83 supplies electric power to the medium detecting circuit 85 and the RTC 87, which need constant supply of electric power, via the power supply controller 81. If the backup power supply 83 is implemented by a secondary battery, it is sometimes charged with electric power supplied from the power supply 89. The power supply 89 is implemented by a primary battery, such as an alkaline battery or a lithium battery, a secondary battery, such as a NiCd battery, a NiMH battery, or a Li battery, or an AC adapter, and supplies electric power to components of the main unit 29 via the power supply controller 81. Connectors 91 and 93 connect between the main unit 29 and the power supply 89.

An interface 96 provides interface with the storage medium 71, such as a memory card or a hard disk. A connector 97 is provided on the main unit 29 for connecting the storage medium 71 to the main unit 29. In the present embodiment, the main unit 29 is provided with a single set of an interface and a connector for attachment of the storage medium 71, but it is to be understood that the main unit 29 may be provided with either one set of an interface and a connector or a plurality of sets thereof. The interface and the connector may be implemented by ones compliant with the standard of a PCM-CIA (Personal Computer Memory Card International Association) card or a CF (Compact Flash (registered trademark)) card.

The digital camera is capable of performing a shooting operation using only the optical viewfinder 69, without using the electronic viewfinder function of the image display section 59. The optical viewfinder 69 has some of the functions of the display section 67, for example, performing in-focus display, shake warning display, flash charging display, shutter-speed display, diaphragm value display, and exposure correction display.

The RTC 87 has a clock oscillator 13 connected thereto, for operating the RTC 87. The RTC 87 is time managing means for managing time within the digital camera based on a clock signal from the clock oscillator 13, and is configured such that electric power is constantly supplied to the RTC 87 from the power supply 89 or the backup power supply 83 via the power supply controller 81 even when the power-off mode is set by the mode dial switch 73. The main CPU 45 is capable of reading out time from the RTC 87 through serial communications. The main CPU 45 is connected to a clock oscillator 11 that outputs a relatively high frequency clock signal. The clock signal provided by the clock oscillator 13 is set to a lower frequency than that of the clock signal provided by the clock oscillator 11.

The medium detecting circuit 85 receives a medium detection signal indicative of the sensed status of attachment or detachment of the storage medium 71 to or from the connector 97. The medium detecting circuit 85 detects the status of attachment/detachment of the storage medium 71 based on the signal level of the medium detection signal, irrespective of the status of operation of the main CPU 45. Similarly to the RTC 87, the medium detecting circuit 85 is configured such that electric power is constantly supplied thereto via the power supply controller 81 even when the power-off mode is set by the mode dial switch 73. It is configured such that the main CPU 45 is capable of acquiring the status of attachment or detachment of the storage medium 71 by accessing the medium detecting circuit 85 through serial communication.

Next, first to fifth examples of the pattern of input of the medium detection signal to the medium detecting circuit 85 of the digital camera will be described with reference to FIGS. 2 to 6.

Figure 2:
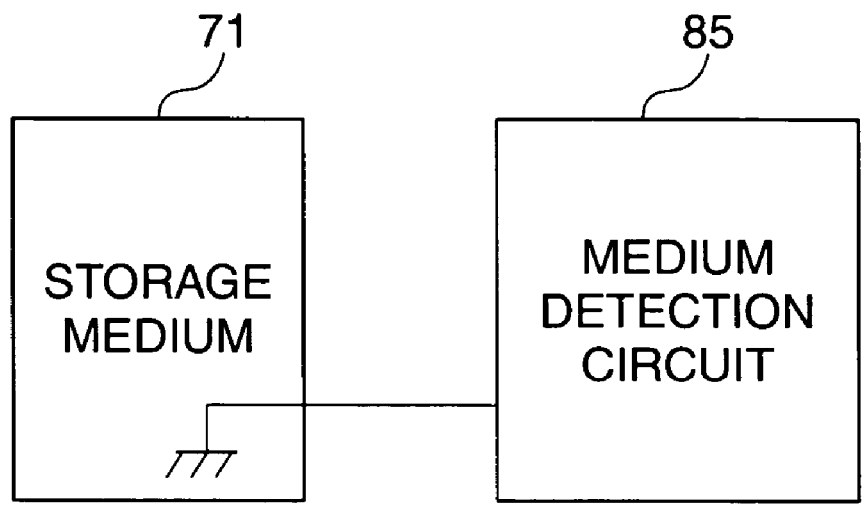
FIG. 2 is a diagram schematically showing a first example of the configuration of a storage medium and a medium detecting circuit appearing in FIG. 1B.

In the first example, as shown in FIG. 2, when the storage medium 71 is attached to a connector (i.e. the connector 97) of the digital camera, the medium detection signal input to the medium detecting circuit 85 goes low.

Figure 3:
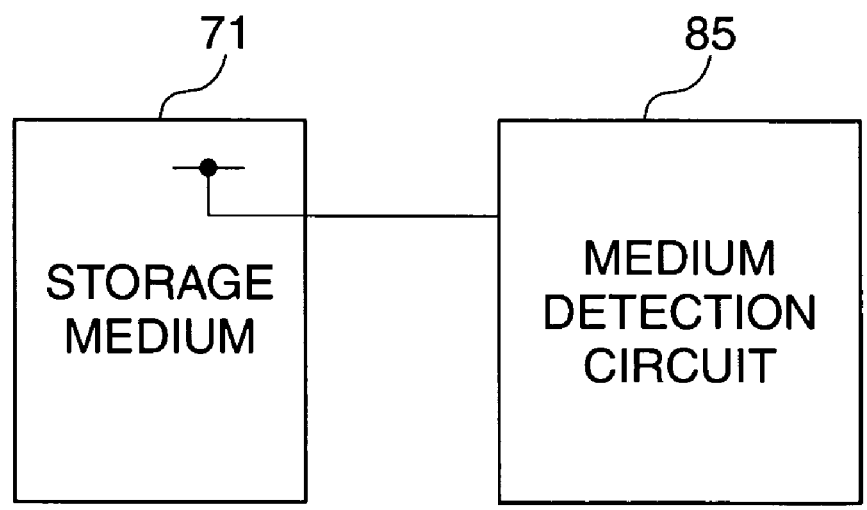
FIG. 3 is a diagram schematically showing a second example of the configuration of the storage medium and the medium detecting circuit.

In the second example, as shown in FIG. 3, when the storage medium 71 is attached to a connector (i.e. the connector 97) of the digital camera, the medium detection signal input to the medium detecting circuit 85 goes high.

Figure 4:
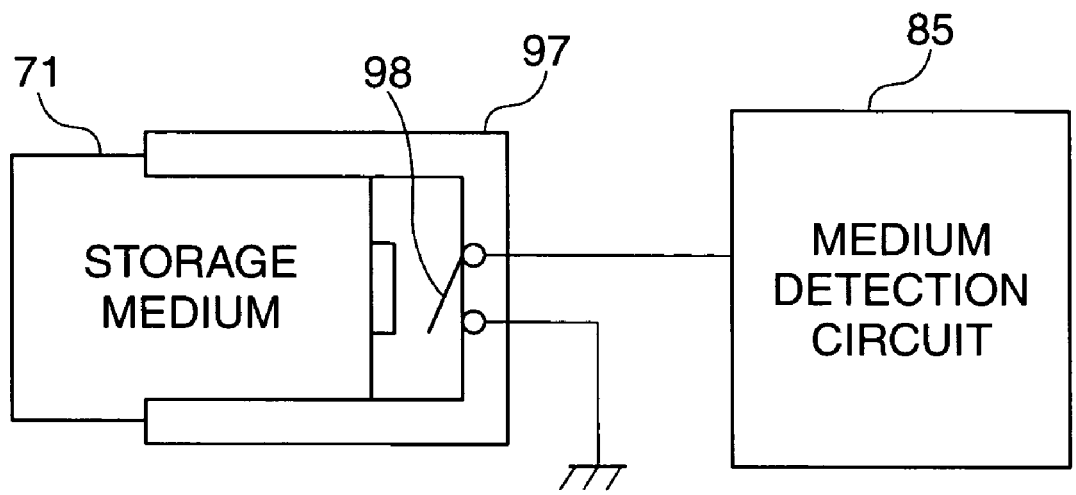
FIG. 4 is a diagram schematically showing a third example of the configuration of the storage medium and the medium detecting circuit.

In the third example, the connector 97 of the medium detecting circuit 85 is provided with a switch 98, as shown in FIG. 4, and when the storage medium 71 is attached to the connector 97, the switch 98 is pressed by the storage medium 71 to turn on, whereby the medium detection signal input to the medium detecting circuit 85 goes low.

Figure 5:
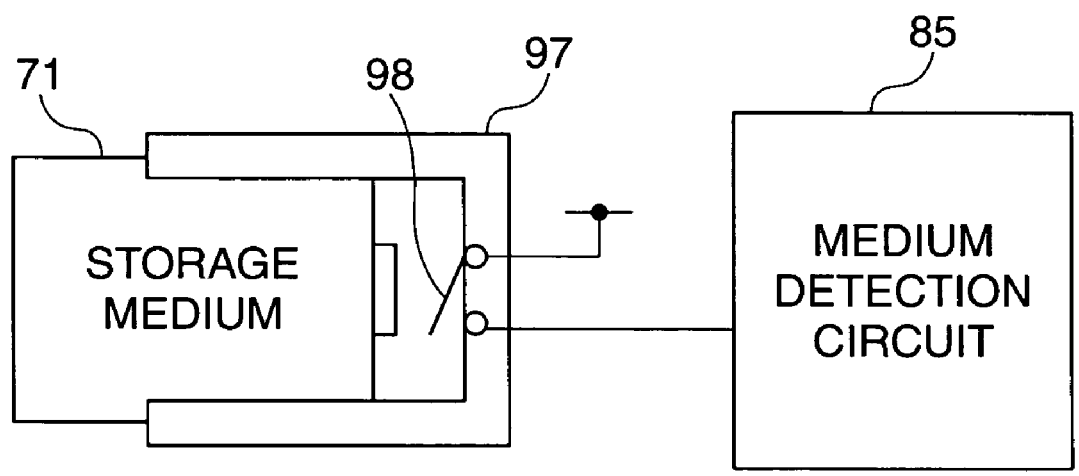
FIG. 5 is a diagram schematically showing a fourth example of the configuration of the storage medium and the medium detecting circuit.

In the fourth example, the connector 97 of the medium detecting circuit 85 is provided with a switch 98, as shown in FIG. 5, and when the storage medium 71 is attached to the connector 97, the switch 98 is pressed by the storage medium 71 to turn on, whereby the medium detection signal input to the medium detecting circuit 85 goes high.

In FIGS. 4 and 5, the switch 98 is normally out of mechanical contact with the storage medium 71, and when the storage medium 71 is attached to the connector 97, the switch 98 is brought into mechanical contact with the storage medium 71 for operation, but it may be configured such that the switch 98 is normally held in mechanical contact with the storage medium 71 and brought out of mechanical contact with the storage medium 71 for operation when the storage medium 71 is attached to the connector 97.

Figure 6:
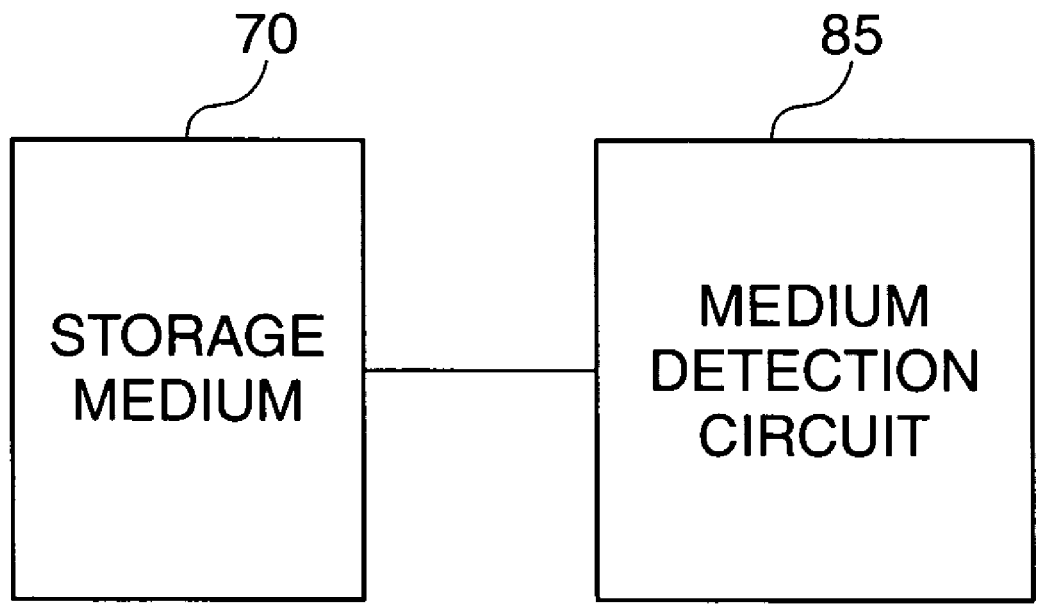
FIG. 6 is a diagram schematically showing the configuration of the medium detecting circuit and a medium receiving cover.

Further, in the fifth example, the digital camera has a connector (i.e. the connector 97) provided with a medium receiving cover 70 for receiving the storage medium 71, and as shown in FIG. 6, a cover detection signal switched between a high level and a low level according to opening/closing of the medium receiving cover 70 is input as a medium detection signal into the medium detecting circuit 85.

Next, the configuration of the medium detecting circuit 85 in the case of receiving the medium detection signal in the input pattern in FIG. 2 will be described with reference to FIG. 7.

Figure 7:
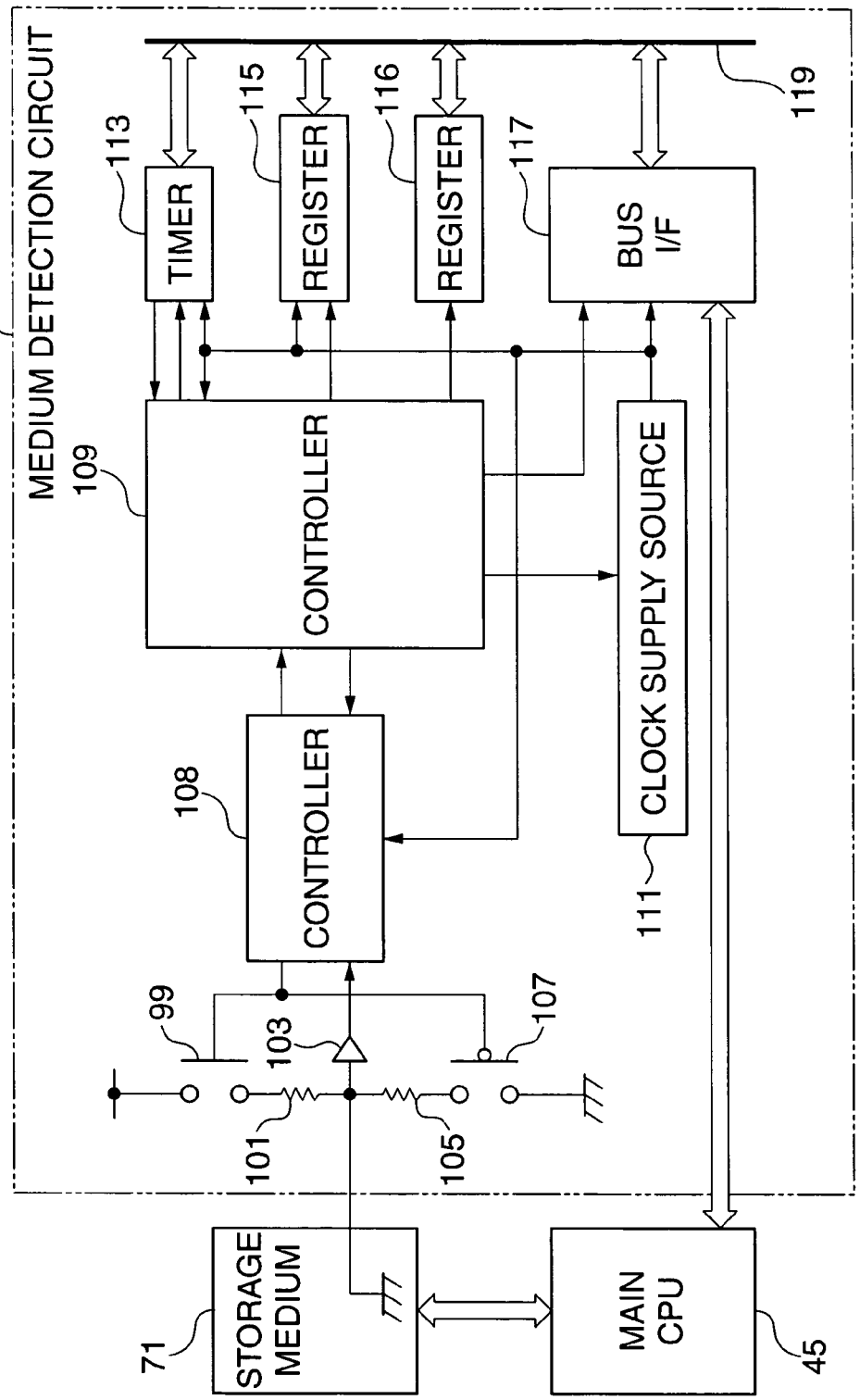
FIG. 7 is a block diagram showing the configuration of the medium detecting circuit in FIGS. 1B and 2.

FIG. 7 is a block diagram showing the configuration of the medium detecting circuit 85 appearing in FIGS. 1B and 2.

As shown in FIG. 7, the medium detecting circuit 85 is comprised of a pull-up switch 99, a pull-down switch 107, a buffer 103, a controller 108, a controller 109, a clock supply source 111, a timer 113, a register 115, a register 116, a bus interface 117, and an internal bus 119.

When the storage medium 71 is attached to the connector 97, a low-level medium detection signal indicative of attachment of the storage medium 71 is input to the medium detecting circuit 85. A pull-up resistor 101 is connected to a signal line through which the medium detection signal is input, such that pull-up can be turned on or off by control of the pull-up switch 99. Further, a pull-down resistor 105 is connected to the signal line through which the medium detection signal is input, such that the pull-down can be turned on or off by control of the pull-down switch 107.

The medium detection signal is input to the controller 108 via the buffer 103. The medium detection signal may be input to the buffer 103 via a chattering removal circuit, not shown, for removing chattering caused when the storage medium 71 is attached to the connector 97, and then input to the controller 108. The pull-up switch 99 and the pull-down switch 107 are controlled by the controller 108 such that not both of them are turned on or off simultaneously, but always one is held in its ON state and the other in its OFF state.

The controller 108 is for detecting the storage medium 71, and controls the pull-up switch 99 and the pull-down switch 107 by a control signal from the controller 109, and detects the status of attachment or detachment of the storage medium 71, followed by inputting a signal indicative of the sensed status to the controller 109. The controller 109 controls the overall operation of the medium detecting circuit 85. The controller 109 outputs to the controller 108 the control signal for causing the controller 108 to detect the status of attachment or detachment of the storage medium 71, receives from the controller 108 the signal indicative of the sensed status, and causes the sensed status to be stored in the register 115. Further, the controller 109 executes one of medium attachment/detachment monitoring processes shown in respective FIGS. 10 to 12, described in detail hereinafter, or a monitoring suspension process in FIG. 13, described in detail hereinafter, according to a program.

The timer 113 performs a measurement operation to determine timing in which the controller 109 outputs to the controller 108 the control signal for causing the controller 108 to detect the status of attachment or detachment of the storage medium 71. The timer 113 is controlled by a signal from the controller 109 to start or stop the measurement operation.

The register 115 stores the sensed status of attachment or detachment of the storage medium 71 as a medium detection flag indicating the removed (detached) status of the storage medium 71 when set e.g. to a value of 1 and the attached status of the storage medium 71 when reset e.g. to a value of 0. Further, the register 115 stores the sensed status of attachment or detachment of the storage medium 71 as a medium removal flag which is set e.g. to a value of 1 when the storage medium 71 is removed and remains set to a value of 1 even when the same storage medium 71 or a different one 71 has been attached thereafter, during the power-off of the digital camera, i.e. during operation of the medium detecting circuit 85, but set e.g. to a value of 0, when the storage medium 71 remains attached, during the power-off of the digital camera, i.e. during operation of the medium detecting circuit 85. The register 115 is accessible by the main CPU 45 as an external device via the bus interface 117. This enables the main CPU 45 to read these flags from the register 115 to thereby acquire the current status of attachment or detachment of the storage medium 71 and information indicative of whether or not the storage medium 71 was removed at least once during the power-off of the digital camera. Further, the main CPU 45 executes the predetermined start-up process based on the sensed status of attachment/detachment, i.e. the flags stored in the register 115.

The register 116 stores settings for the medium detecting circuit 85. The controller 109 controls the medium detecting circuit 85 according to the settings stored in the register 116. The register 116 is accessible by the main CPU 45 via the bus interface 117, for reading and writing. This enables the main CPU 45 to control the medium detecting circuit 85.

The clock supply source 111 supplies a clock signal for operating the medium detecting circuit 85. The clock supply source 111 may be provided not within the medium detecting circuit 85, but outside the same. The timer 113 operates based on the clock signal supplied from the clock supply source 111. The internal bus 119 connects between the timer 113, the register 115, the register 116, and the bus interface 117 within the medium detecting circuit 85.

As described above, according to the present embodiment, the digital camera includes the main CPU 45 for controlling the digital camera, the medium detecting circuit 85 having the controller 109, the register 115, and the bus interface 117, the RTC 87 for performing time management, and the connector 97 which the storage medium 71 is attached to or detached from. The medium detecting circuit 85 monitors the status of attachment/detachment of the storage medium 71 to and from the connector 97 irrespective of the status of operation of the main CPU 45, and stores the sensed status of attachment/detachment of the storage medium 71 in the register 115. In executing the predetermined start-up process, the main CPU 45 can access the register 115 via the bus interface 117 to acquire the sensed status of attachment or detachment of the storage medium 71.

This configuration makes it unnecessary to provide a second CPU in the digital camera in addition to the first CPU (main CPU 45) that manages the overall operation of the digital camera as in the case of the conventional digital camera. Therefore, the circuit configuration can be simplified and the medium detecting circuit 85 including the controllers and the registers can be constructed less expensively than when the digital camera has the second CPU installed therein, which contributes to reduction of the cost of the digital camera.

Further, since the main CPU 45 can start up the storage medium 71 without initializing the same, by reading out the sensed status of attachment/detachment of the storage medium 71 from the register 115 accessed via the bus interface 117, it is possible to reduce start-up time.

The status of attachment/detachment of the storage medium 71 is monitored by the medium detecting circuit 85 supplied with electric power via the power supply controller 81, irrespective of the status of operation of the main CPU 45, or in other words, even when the power-off mode is set by the mode dial switch 73, so that the status of attachment/detachment of the storage medium 71 can be monitored with reduced power consumption.

Although in the first embodiment, the register 115 for storing the sensed status of attachment or detachment of the storage medium 71 and the register 116 for storing the settings for the overall operation of the medium detecting circuit 85 are provided separately in the medium detecting circuit 85, this is not limitative, but the medium detecting circuit 85 may be configured to have a single register provided with an area for storing the sensed status of attachment/detachment of and an area for storing the settings for the overall operation of the medium detecting circuit 85.

Next, a second embodiment of the present invention will be described.

The second embodiment is distinguished from the above-described first embodiment in that the RTC 87 and the medium detecting circuit 85 are integrated into a single device. The other elements in the present embodiment are identical to the corresponding ones in the first embodiment (FIGS. 1A and 1B), and therefore description thereof is omitted.

First, the configuration of the RTC 87 will be described with reference to FIG. 8A, before a description is given of how the RTC 87 and the medium detecting circuit 85 are formed into the single device.

Figure 8A:
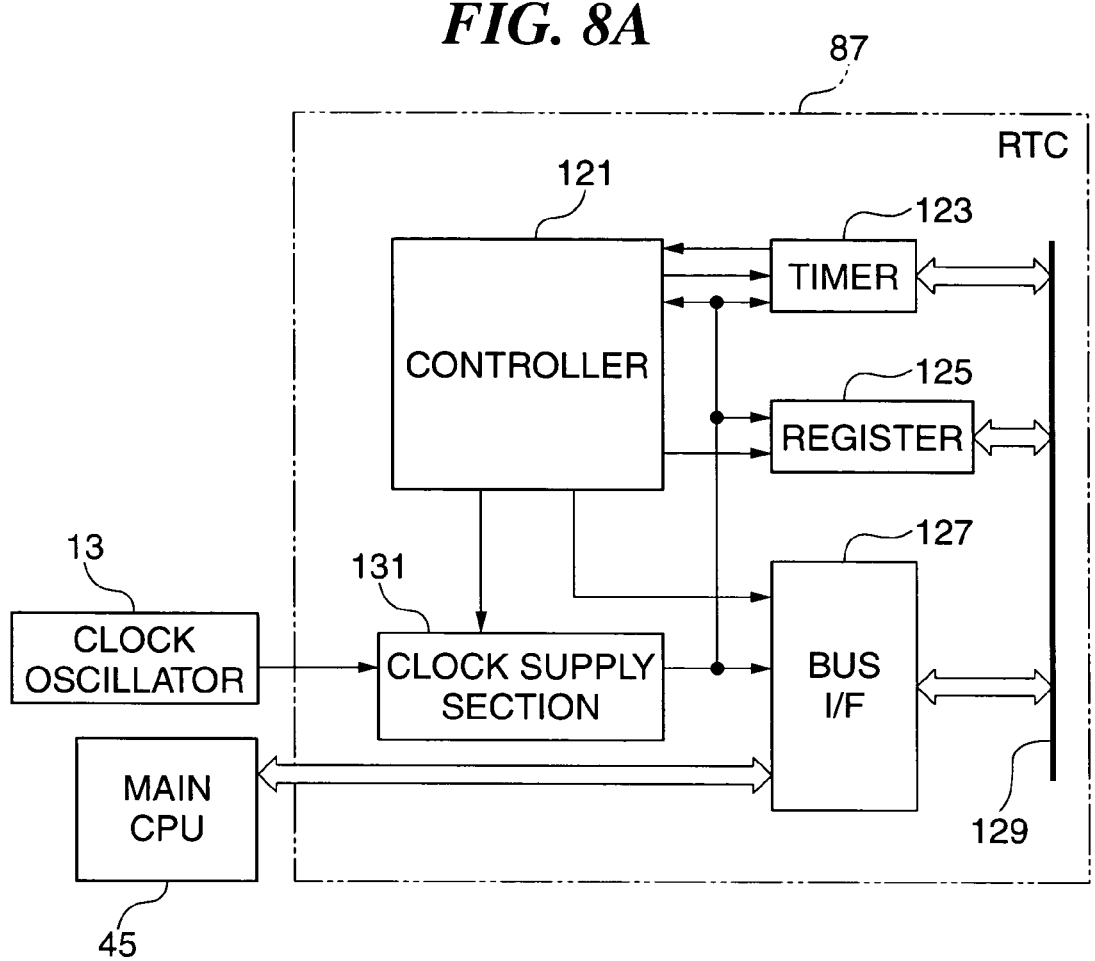
FIG. 8A is a block diagram showing the configuration of a RTC (Real Time Clock) in the first embodiment of the present invention.

FIG. 8A is a block diagram showing the configuration of the RTC 87 appearing in FIG. 1B according to the first embodiment.

As shown in FIG. 8A, the RTC 87 is comprised of a controller 121, a timer 123, a register 125, a bus interface 127, an internal bus 129, and a clock supply section 131.

A clock signal as a reference signal for operation of the RTC 87 is input to the clock supply section 131 from the clock oscillator 13 outside the RTC 87. The clock supply section 131 has a PLL (Phase Lock Loop) circuit incorporated therein so that the input clock signal can be multiplied, and supplies a clock signal required for operations of the controller 121, the timer 123, the register 125, and the bus interface 127. The controller 121 controls the overall operation of the RTC 87 based on set values stored in the register 125.

The timer 123 has a function of counting a predetermined time period or an arbitrary time period to generate an interrupt and a function of measuring hours, minutes, and seconds and storing the measured value in the register 125. The register 125 stores set values for operation of the RTC 87 and the value of hours, minutes, and seconds measured by the timer 123. The register 125 is accessible by the main CPU 45 as an external device via the bus interface 127. This enables the main CPU to recognize time and control the RTC 87.

Similarly to the RTC 87 shown in FIG. 8A, the medium detecting circuit 85 shown in FIG. 7 has the controllers, the timer, the registers, and the bus interface incorporated therein as component elements. Therefore, by integrating the controller 121 of the RTC 87 into the controller 109 of the medium detecting circuit 85, the register 125 of the RTC 87 into the register 116 of the medium detecting circuit 85, and the timer 123 of the RTC 87 into the timer 113 of the medium detecting circuit 85, respectively, and using a common bus interface, it is possible to construct the RTC 87 and the medium detecting circuit 85 as a single device.

Figure 8B:
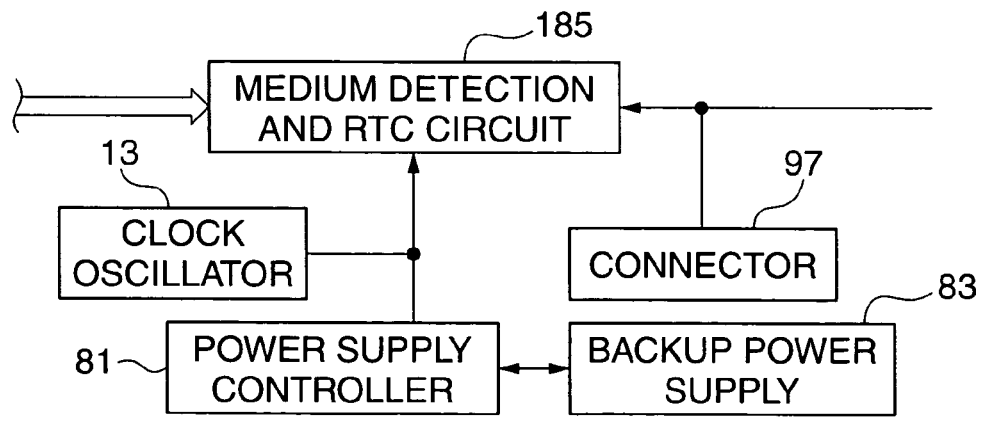
FIG. 8B is a fragmentary block diagram showing the configuration of a RTC (Real Time Clock) in a second embodiment of the present invention.

FIG. 8B is a fragmentary block diagram showing the configuration of a RTC (Real Time Clock) in the second embodiment of the present invention.

As shown in FIG. 8B, in the present embodiment, the medium detecting circuit and the RTC are integrated into a single circuit, i.e. a medium detection and RTC circuit 185. The clock oscillator 13 is directly connected to the medium detection and RTC circuit 185.

As described above, according to the present embodiment, by constructing the RTC 87 and the medium detecting circuit 85 as a single device, a controller, a register, a timer, and so forth can be shared between the RTC 87 and the medium detecting circuit 85, which makes it possible to install the RTC function and the storage medium detecting function in the digital camera without increasing the number of component parts or the mounting area. Further, the main CPU 45 does not have to access the RTC 87 and the medium detecting circuit 85 separately, which makes it easier to control the digital camera.

Next, a third embodiment of the present invention will be described.

Figure 9:
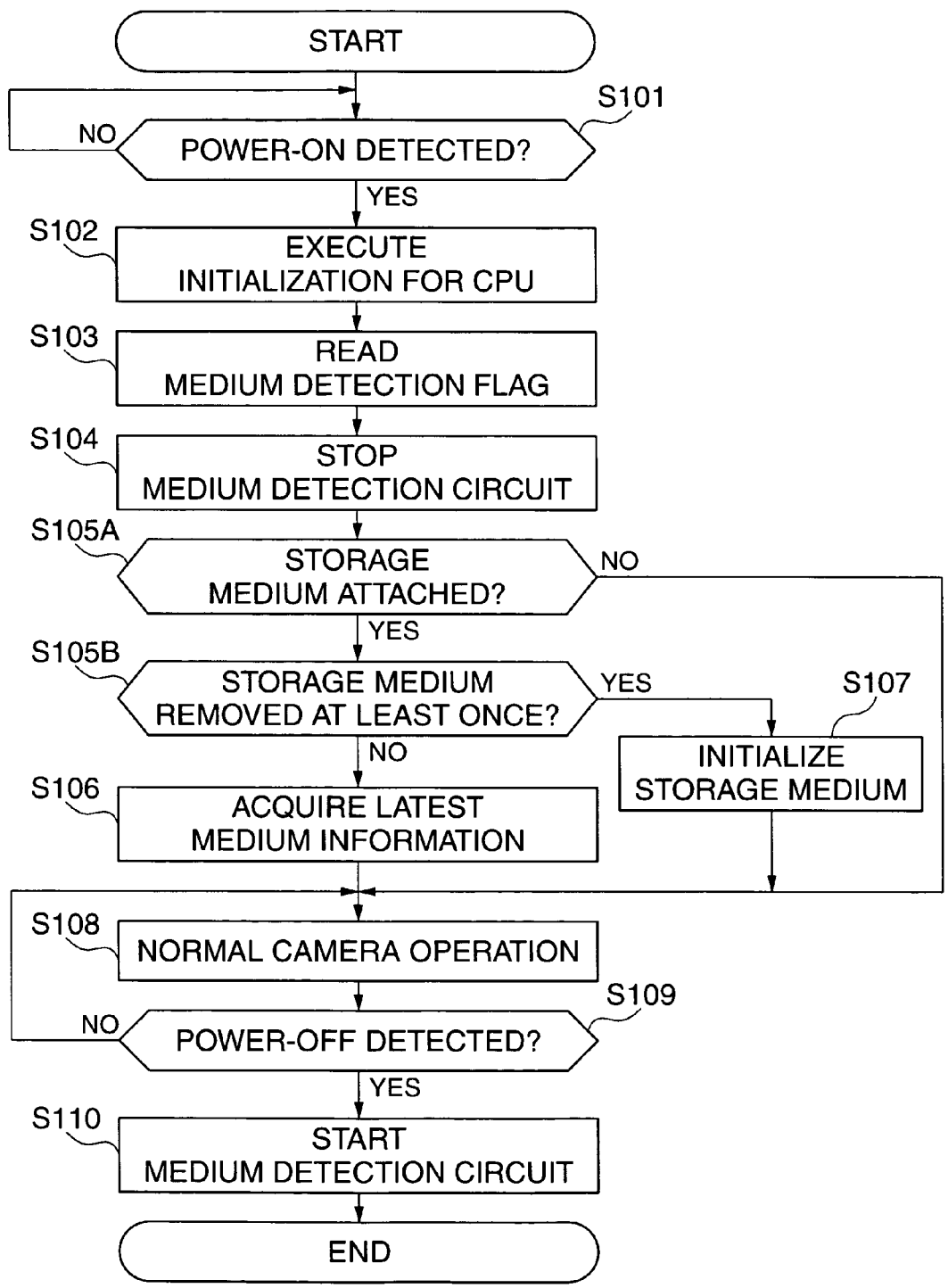
FIG. 9 is a flowchart of the operation of a main CPU of a digital camera as an electronic apparatus according to a third embodiment of the present invention.

The third embodiment of the present invention is distinguished from the above-described first and second embodiments in that the main CPU 45 operates as shown in FIG. 9. The other elements in the present embodiment are identical to the corresponding ones in the first embodiment (FIGS. 1A and 1B), and therefore description thereof is omitted.

FIG. 9 is a flowchart of the operation of the main CPU 45.

As shown in FIG. 9, the main CPU 45 determines whether or not power-on, i.e. switching on of the mode dial switch 73 for starting the digital camera has been detected (step S101). If power-on has not been detected, detection thereof is awaited. When power-on has been detected, initialization is executed to make the main CPU 45 operative (step S102). Then, the main CPU 45 communicates with the medium detecting circuit 85 to read out the medium detection flag indicative of the sensed status of attachment/detachment of the storage medium 71 and the medium removal flag indicative of whether the storage medium 71 was removed at least once during the power off of the digital camera, from the register 115 of the medium detecting circuit 85 (step S103).

In the power-on state, the main CPU 45 can monitor the status of attachment/detachment of the storage medium 71, and hence it is not necessary to keep the medium detecting circuit 85 operating. Therefore, the main CPU 45 stops the operation of the medium detecting circuit 85 (step S104). Then, the main CPU 45 determines, based on the medium detection flag read out in the step S103, whether or not the storage medium 71 is in a state attached to the connector 97 (step S105A). If it is determined that the storage medium 71 is not attached, the process proceeds to a step S108, whereas if it is determined that the storage medium 71 is attached, the process proceeds to a step S105B, wherein the main CPU 45 determines, based on the medium removal flag read out in the step S103, whether or not the storage medium 71 was removed from the connector 97 at least once. If it is determined that the storage medium 71 was not removed from the connector 97 even once, the process proceeds to a step S106, whereas if the storage medium 71 is removed from the connector 97 at least once, the process proceeds to a step S107.

If the storage medium 71 was removed from the connector 97 at least once, the main CPU 45 initializes the storage medium 71. Then, the main CPU 45 reads out file management information from the initialized storage medium 71 and stores the same in the ROM 7 or the RAM 17 (step S107), followed by the process proceeding to the step S108. On the other hand, if the storage medium 71 was not removed from the connector 97 even once, which means that the latest file management information of the storage medium 71 is stored in the ROM 7 or the RAM 17, the main CPU 45 reads out the latest file management information from the ROM 7 or the RAM 17 (step S106), followed by the process proceeding to the step S108.

Next, the main CPU 45 performs a normal camera operation according to an operation mode selected by a user's operation (step S108). The present invention does not directly relate to the camera operation, and hence description thereof is omitted. Then, the main CPU 45 determines whether or not power-off, i.e. switching off of the mode dial switch 73 has been detected (step S109). If power-off has been detected, the main CPU 45 starts the medium detecting circuit 85 and carries out a power-off process (step S110), followed by terminating the present process.

In summary, when the main CPU 45 determines based on the values of the medium detection flag and the medium removal flag that the storage medium 71 is was not removed from the connector 97 during the power-off the digital camera, it reads out file management information stored in the ROM 7 or the RAM 17 and then executes the start-up process, whereas when the main CPU 45 determines that the storage medium 71 was removed from the connector 97 at least once and the same or different storage medium 71 has been attached, it reads out file management information from the storage medium 71 and then executes the start-up process.

As described above, according to the present embodiment, when the storage medium 71 was not removed from the connector 97 during power-off, file management information stored in the ROM 7 or the RAM 17, which can be accessed at a faster access speed than the storage medium 71 is, is used, so that file management information need not be read out from the storage medium 71 each time the digital camera is started, which makes it possible to reduce start-up time.

Next, a fourth embodiment of the present invention will be described.

Figure 10:
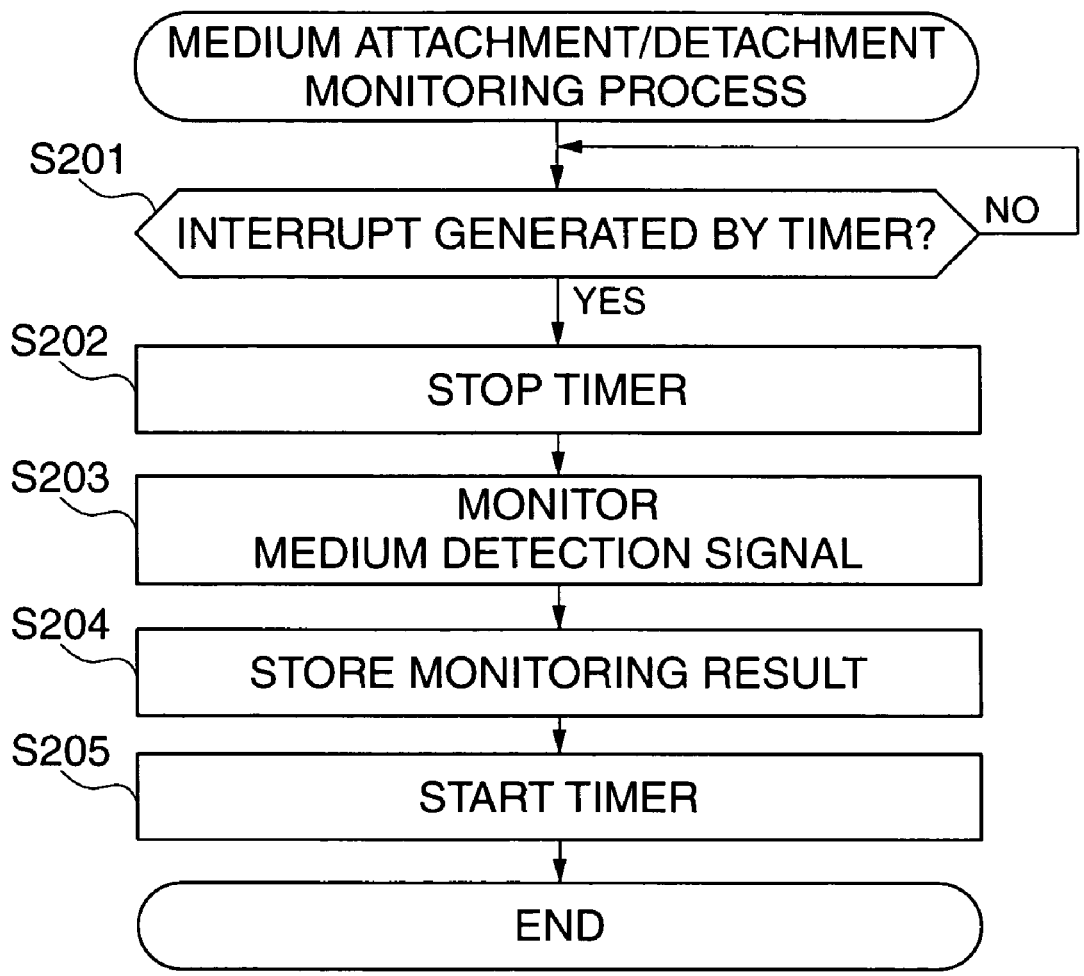
FIG. 10 is a flowchart of a medium attachment/detachment monitoring process executed by a medium detecting circuit of a digital camera as an electronic apparatus according to a fourth embodiment of the present invention.

The fourth embodiment of the present invention is distinguished from the above-described first to third embodiments in that the medium detecting circuit 85 does not constantly monitor the status of attachment/detachment of the storage medium 71, but it performs a monitoring operation at predetermined time intervals, as shown in FIG. 10. The other elements in the present embodiment are identical to the corresponding ones in the first embodiment (FIGS. 1A and 1B), and therefore description thereof is omitted.

FIG. 10 is a flowchart of a medium attachment/detachment monitoring process executed by the medium detecting circuit 85 of the digital camera as an electronic apparatus according to the fourth embodiment.

The timer 113 of the medium detecting circuit 85 shown in FIG. 7 generates an interrupt at predetermined time intervals (e.g. 0.1 msec). Referring to FIG. 10, first, the controller awaits generation of an interrupt by the timer 113 for notifying the lapse of a predetermined time period for monitoring of the status of attachment/detachment of the storage medium 71 (step S201). When an interrupt is generated by the timer 113, the controller 109 temporarily stops the timer 113 (step S202). At this time, the pull-up switch 99 is turned on, and the pull-down switch 107 is turned off.

Then, the controller 109 monitors the medium detection signal output from the buffer 103 and indicative of whether or not the storage medium 71 is attached to the connector 97 (step S203). If the medium detection signal is at a lower level than the power supply level, it indicates that the storage medium 71 is attached to the connector 97, whereas if the medium detection signal is at the same level as the power supply level, it indicates that the storage medium 71 is not attached to the connector 97.

Next, the controller 109 stores a monitoring result obtained by monitoring the storage medium 71 in the step S203 in the register 115, as a detected status of attachment/detachment of the storage medium 71 (step S204). Thereafter, the controller 109 causes the timer 113 to resume its operation which has been stopped (step S205). At this time, the pull-up switch 99 is turned off, and the pull-down switch 107 is turned on, followed by terminating the present process.

As described above, according to the present embodiment, since the medium detecting circuit 85 monitors the status of attachment/detachment of the storage medium 71 at the predetermined time intervals, it is possible to reduce power consumption by a larger amount than in the case where the storage medium 71 is constantly monitored.

Although in the above-described fourth embodiment, the medium detecting circuit 85 monitors the status of attachment/detachment of the storage medium 71 at intervals of a predetermined wait time period, this is not limitative, but there may be provided power-saving modes of a plurality of levels associated, respectively, with a plurality of wait time periods for which the monitoring of the status of attachment/detachment of the storage medium 71 is awaited and the user may be allowed to select a desired one from the power-saving modes displayed on the display section 67 or the like, to cause the status of attachment/detachment of the storage medium 71 to be monitored at intervals of a wait time period associated with the selected power-saving mode.

Next, a fifth embodiment of the present invention will be described.

The fifth embodiment of the present invention is distinguished from the above-described fourth embodiment in that time intervals at which an interrupt is generated by the timer 113 of the medium detecting circuit 85 can be set to time intervals of a desired time period, and a set time interval storage area for storing the set time intervals is provided in the register 116. The other elements in the present embodiment are identical to the corresponding ones in the first embodiment (FIGS. 1A and 1B), and therefore description thereof is omitted.

Figure 11:
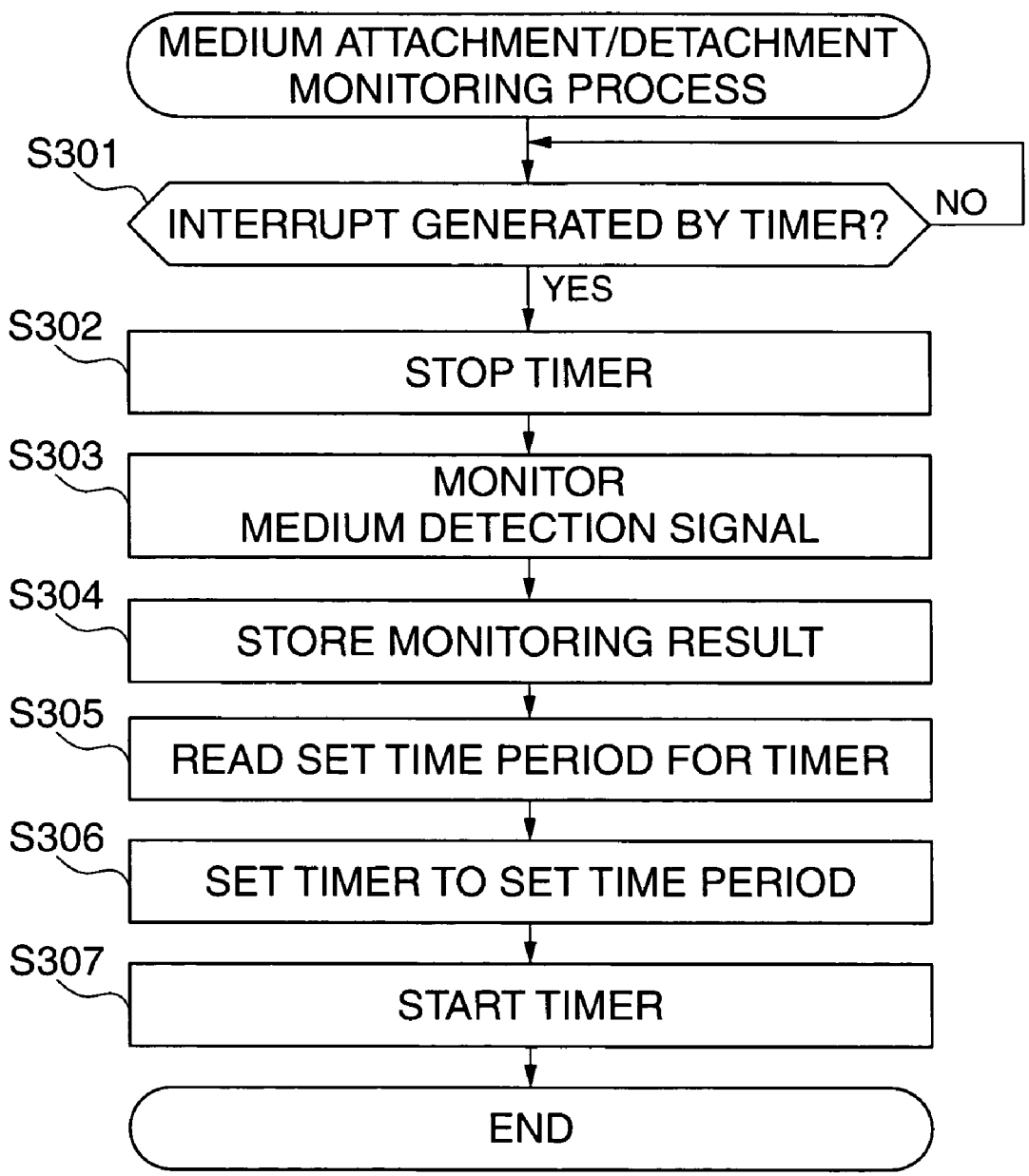
FIG. 11 is a flowchart of a medium attachment/detachment monitoring process executed by a medium detecting circuit of a digital camera as an electronic apparatus according to a fifth embodiment of the present invention.

FIG. 11 is a flowchart of a medium attachment/detachment monitoring process executed by the medium detecting circuit 85 of the digital camera as an electronic apparatus according to the fifth embodiment.

The timer 113 of the medium detecting circuit 85 shown in FIG. 7 generates an interrupt at set time intervals stored in the set time storage area of the register 116. Referring to FIG. 11, first, the controller 109 awaits generation of an interrupt by the timer 113 for notifying the lapse of a time period for monitoring of the status of attachment/detachment of the storage medium 71 (step S301). When an interrupt is generated by the timer 113, the controller 109 temporarily stops the timer 113 (step S302). At this time, the pull-up switch 99 is turned on, and the pull-down switch 107 is turned off.

Next, the controller 109 monitors the medium detection signal output from the buffer 103 and indicative of whether or not the storage medium 71 is attached to the connector 97 (step S303). Then, the controller 109 stores a monitoring result obtained by the monitoring in the step S303 in the register 115, as a detected status of attachment/detachment the storage medium 71 (step S304). Further, the controller 109 reads out the set time intervals to be set to the timer 113 from the register 116 (step S305), and sets the timer 113 to the set time intervals (step S306). Thereafter, the controller 109 causes the timer 113 to resume its operation which has been stopped (step S307). At this time, the pull-up switch 99 is turned off, and the pull-down switch 107 is turned on, followed by terminating the present process.

In the present embodiment, the main CPU 45 can set the time intervals at which an interrupt is generated by the timer 113 to time intervals of a desired time period by accessing the register 116 via the bus interface 117 of the medium detecting circuit 85, so that the time period for monitoring the status of attachment/detachment of the storage medium 71 by the medium detecting circuit 85 can be set as desired according to the situations. For example, the monitoring time period can be set such that when the main CPU 45 is stopped in a state where the voltage of the power supply 89 is low, the time period for monitoring the status of attachment/detachment of the storage medium 71 is prolonged so as to lengthen the service life of the power supply 89.

As described above, according to the present embodiment, since the monitoring time period for monitoring the status of attachment/detachment of the storage medium 71 by the medium detecting circuit 85 can be set by the main CPU 45, it is possible to change the monitoring time period, as required, according to the situations such as lowering of the voltage of the power supply 89. This makes it possible to reduce power consumption by a larger amount than in the fourth embodiment.

Although in the above-described fifth embodiment, the time intervals for generation of an interrupt by the timer 113 of the medium detecting circuit 85 can be set to desired time intervals, and the set time intervals are stored in the register 116, this is not limitative, but there may be provided power-saving modes of a plurality of levels associated, respectively, with a plurality of set time intervals for generation of an interrupt by the timer 113, and the user may be allowed to select a desired one from the power-saving modes displayed on the display section 67 or the like to store set time intervals associated with the selected power-saving mode in the register 116.

Next, a sixth embodiment of the present invention will be described.

The sixth embodiment of the present invention is distinguished from the above-described fifth embodiment in that the monitoring time for monitoring the status of attachment/detachment of the storage medium 71 by the medium detecting circuit 85 is not set by the main CPU 45, but a history of attachment/detachment (insertion/pull-out) of the storage medium 71 is stored in the register 116, and the controller 109 determines the monitoring time period based on the attachment/detachment history stored in the register 116. The other elements in the present embodiment are identical to the corresponding ones in the first embodiment (FIGS. 1A and 1B), and therefore description thereof is omitted.

Figure 12:
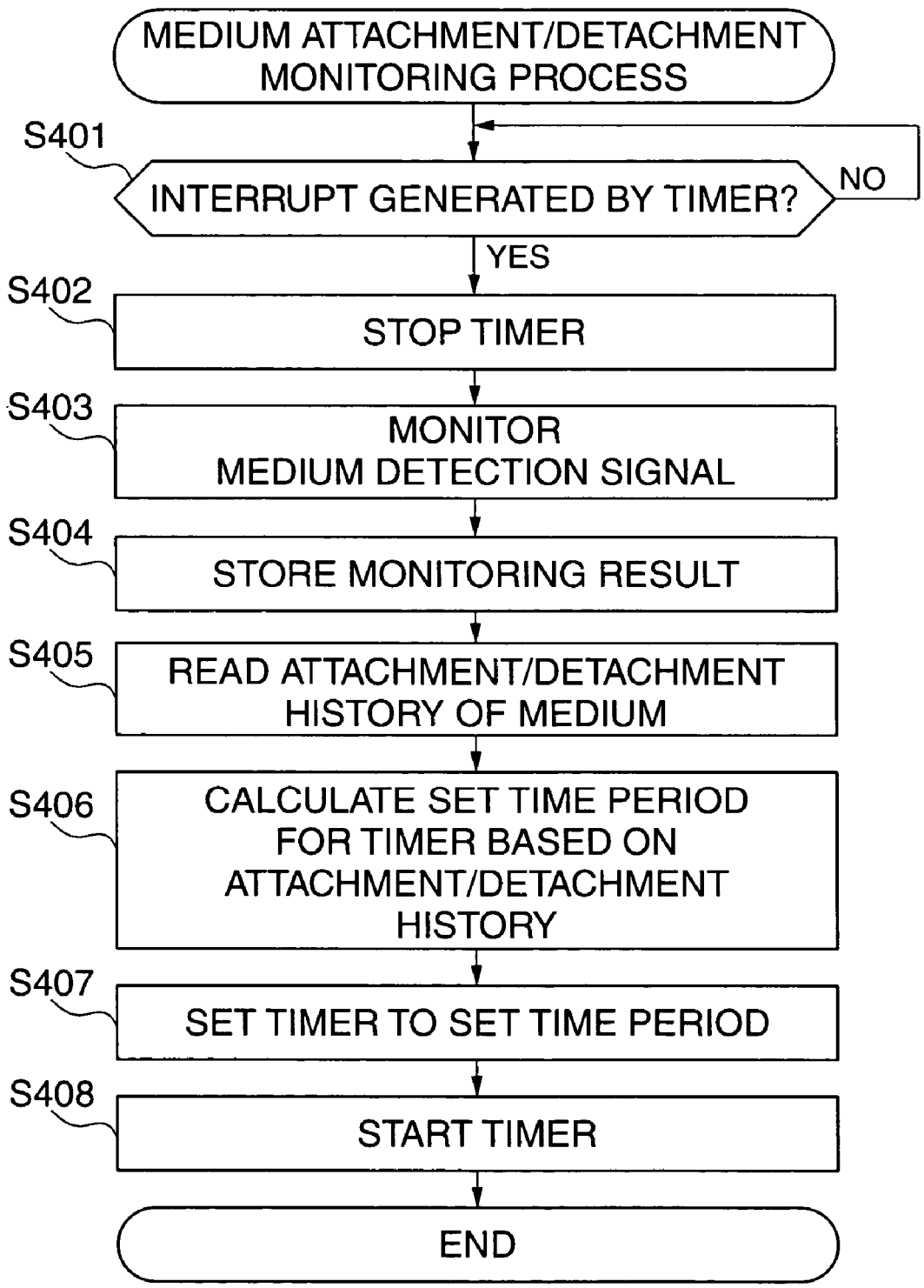
FIG. 12 is a flowchart of a medium attachment/detachment monitoring process executed by a medium detecting circuit of a digital camera as an electronic apparatus according to a sixth embodiment of the present invention.

FIG. 12 is a flowchart of a medium attachment/detachment monitoring process executed by the medium detecting circuit 85 of the digital camera as an electronic apparatus according to the sixth embodiment.

The timer 113 of the medium detecting circuit 85 shown in FIG. 7 generates an interrupt at time intervals set in the register 116. Referring to FIG. 12, first, the controller 109 awaits generation of an interrupt by the timer 113 for notifying the lapse of a time period for monitoring of the status of attachment/detachment of the storage medium 71 (step S401). When an interrupt is generated by the timer 113, the controller 109 temporarily stops the timer 113 (step S402). At this time, the pull-up switch 99 is turned on, and the pull-down switch 107 is turned off.

Next, the controller 109 monitors the medium detection signal output from the buffer 103 and indicative of whether or not the storage medium 71 is attached to the connector 97 (step S403). Then, the controller 109 stores a monitoring result obtained by the monitoring in the step S403 in the register 115, as a sensed attachment/detachment status of the storage medium 71, and at the same time stores the monitoring result as an attachment/detachment history in the register 116 (step S404). Then, the controller 109 reads out the attachment/detachment history from the register 116 (step S405), and statistically calculates the average, histogram, and the like of time intervals at which the storage medium 71 was attached/detached in the past, to thereby determine an optimal value (set time period) of a time period to be set in the timer 113 for monitoring the status of attachment/detachment of the storage medium 71 (step S406).

Next, the controller 109 sets the timer 113 to the obtained set time period (step S407). Thereafter, the controller 109 causes the timer 113 to resume its operation which has been stopped (step S408). At this time, the pull-up switch 99 is turned off, and the pull-down switch 107 is turned on, followed by terminating the present process.

As described above, according to the present embodiment, the set time period for monitoring the status of attachment/detachment of the storage medium 71 is determined based on the history of attachment/detachment of the storage medium 71, so that when the storage medium 71 is not frequently attached/detached, the frequency of the monitoring the attachment/detachment of the storage medium 71 decreases, which makes it possible to reduce power consumption by a larger amount than in the fourth embodiment.

Next, a seventh embodiment of the present invention will be described.

The seventh embodiment is distinguished from the above-described first to sixth embodiments in that when the medium detecting circuit 85 detects removal of the storage medium 71 from the connector 97, monitoring of the status of attachment/detachment of the storage medium 71 is suspended from then on. The other elements in the present embodiment are identical to the corresponding ones in the first embodiment (FIGS. 1A and 1B), and therefore description thereof is omitted.

Figure 13:
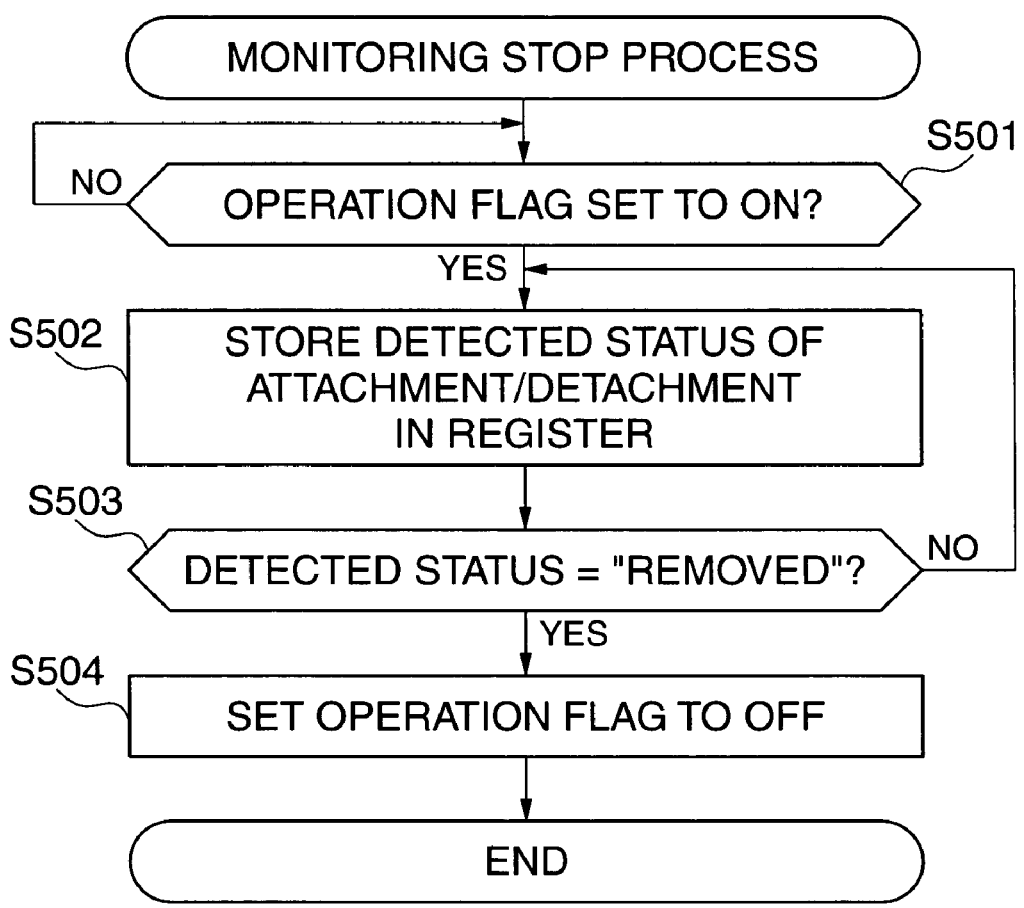
FIG. 13 is a flowchart of a medium attachment/detachment monitoring process executed by a controller of a medium detecting circuit of a digital camera as an electronic apparatus according to a seventh embodiment of the present invention.

FIG. 13 is a flowchart of a medium attachment/detachment monitoring process executed by the controller 109 of the medium detecting circuit 85 of the digital camera as an electronic apparatus according to the seventh embodiment.

As shown in FIG. 13, the controller 109 of the medium detecting circuit 85 reads out an operation flag provided in the register 115, for operating and stopping the medium detecting circuit 85, and determines the status (ON/OFF) of the operation flag (step S501). If the operation flag is set to OFF, which means that the medium detecting circuit 85 is in stoppage, the process returns to the step S501. On the other hand, if the operation flag is set to ON, which means that the medium detecting circuit 85 is in operation, the controller 109 stores the detected status of attachment/detachment of the storage medium 71 in the register 115 (step S502).

Next, the controller 109 determines whether or not the detected status of attachment/detachment indicates that the storage medium 71 has been removed or detached (step S503). If the storage medium 71 has not been removed from the connector 97, the process proceeds to the step S502. On the other hand, if the storage medium 71 has been removed from the connector 97, the controller 109 sets the operation flag to the status (OFF) indicative of stoppage of the medium detecting circuit 85 (step S504), followed by terminating the present process.

It should be noted that the steps S502 and S503 in FIG. 13 may be executed based on any of the medium status monitoring processes shown in FIGS. 10 to 12.

As described above, according to the present embodiment, monitoring of the status of attachment/detachment of the storage medium 71 by the medium detecting circuit 85 is suspended after removal of the storage medium 71 from the connector 97, which makes it possible to achieve further reduction of power consumption.

In the following, a description will be given of eighth to sixteenth embodiments of the present invention.

The eighth embodiment of the present invention is distinguished from the above-described first to seventh embodiments in that the status of attachment/detachment of the storage medium 71 to and from the connector 97 can be monitored by the medium detecting circuit 85 made operable by the backup power supply 83 even when electric power is not supplied to the main CPU 45 due to turn-off of the power supply 89, and signal lines connecting the main CPU 45 to the medium detecting circuit 85 and the RTC 87, respectively, for serial communication are at least partially formed by a common line. The other elements in the present embodiment are identical to the corresponding ones in the first embodiment (FIGS. 1A and 1B), and therefore description thereof is omitted.

Now, a detailed description will be given of the configuration of the medium detecting circuit 85 of the digital camera.

Figure 14:
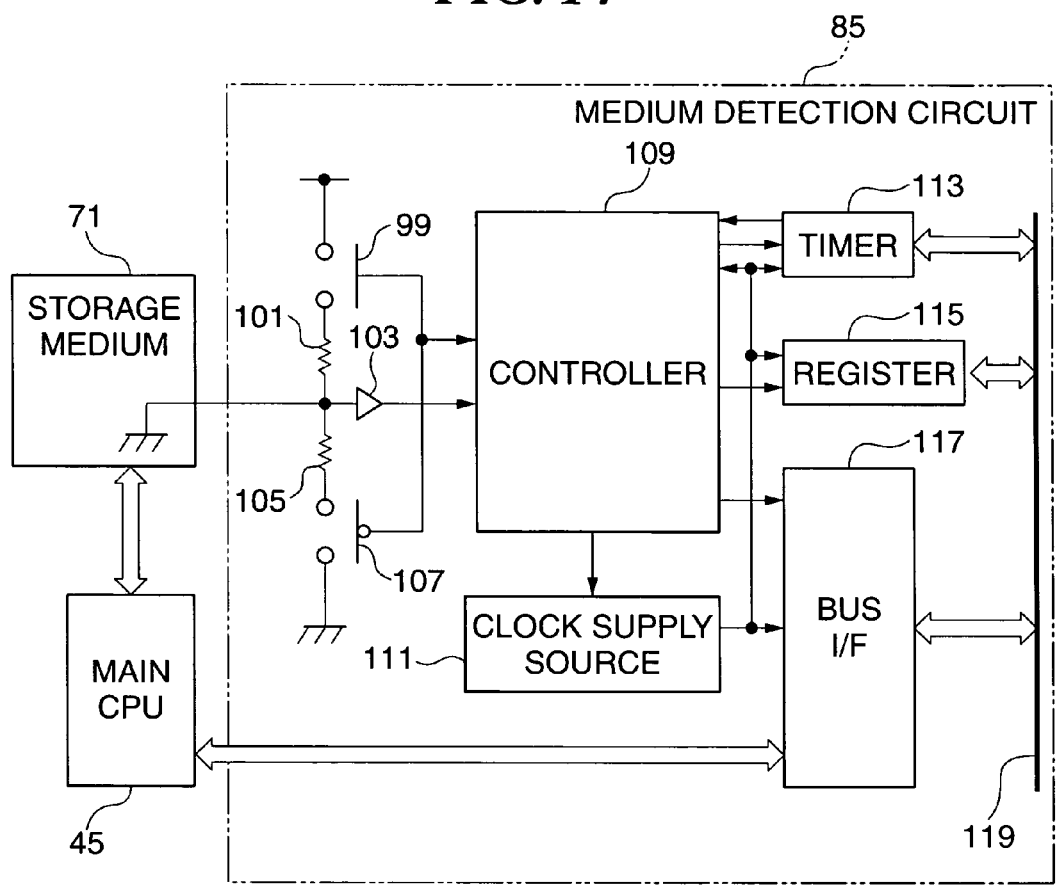
FIG. 14 is a block diagram showing the configuration of a medium detecting circuit of a digital camera as an electronic apparatus according to an eighth embodiment of the present invention.

FIG. 14 is a block diagram showing the configuration of the medium detecting circuit 85 of the digital camera as an electronic apparatus according to the eighth embodiment.

The medium detecting circuit 85 shown in FIG. 14 is formed with the controller 108 and the register 116 omitted from the medium detecting circuit 85 shown in FIG. 7, and is comprised of a pull-up switch 99, a pull-down switch 107, a buffer 103, a controller 109, a clock supply source 111, a timer 113, a register 115, a bus interface 117, and an internal bus 119.

When the storage medium 71 is attached to the connector 97, a medium detection signal of ground (hereinafter abbreviated as "GND") level indicative of attachment of the storage medium 71 to the connector 97 is input to the medium detecting circuit 85. The pull-up resistor 101 is connected to the signal line through which the medium detection signal is input, such that pull-up can be turned on or off by control of the pull-up switch 99. Further, the pull-down resistor 105 is connected to the signal line through which the medium detection signal is input, such that the pull-down can be turned on or off by control of the pull-down switch 107.

The medium detection signal is input to the controller 109 via the buffer 103. It may be configured such that the medium detection signal is input to the buffer 103 via the chattering removal circuit, not shown, for removing chattering caused when the storage medium 71 is attached to the connector 97, and then input to the controller 109. The pull-up switch 99 and the pull-down switch 107 are controlled by the controller 109 such that not both of them are turned on or off simultaneously, but always one is held in its ON state and the other in its OFF state.

The controller 109 detects the status of attachment/detachment of the storage medium 71 to and from the connector 97. The clock supply source 111 supplies a clock signal for operating the medium detecting circuit 85. The clock supply source 111 may be provided not within the medium detecting circuit 85, but outside the same. The timer 113 operates based on the clock signal supplied from the clock supply source 111, to count a predetermined time period or an arbitrary time period and notify the controller of the lapse of the time period.

The register 115 is formed as a register group comprised of a register for storing information that determines the status of operation of the controller 109, a register for storing a set time period for the timer 113, and a register for storing information indicative of the detected status of attachment/detachment of the storage medium 71 to and from the connector 97. The bus interface 117 provides interface with the register 115 so that the main CPU 45 as an external device can read information from the register 115 or write the same therein. The internal bus 119 connects between the timer 113, the register 115, and the bus interface 117 within the medium detecting circuit 85.

The main CPU 45 can access the register 115 of the medium detecting circuit 85 through serial communication with the medium detecting circuit 85. The main CPU 45 carries out a predetermined start-up process such that when the main CPU 45 determines, based on the detected status of attachment/detachment of the storage medium 71, that the storage medium 71 was not removed from the connector 97 even once during the power-off of the digital camera, it reads out file management information from the ROM 7 or the RAM 17 and executes the start-up process, whereas when the main CPU 45 determines that the storage medium 71 was removed from the connector 97 and the same or different storage medium 71 has been attached during the power-off of the digital camera, it reads out file management information from the attached storage medium 71 and executes the start-up process. This makes it possible to reduce start-up time for starting the digital camera.

As described above, according to the present embodiment, it is configured such that the signal lines connecting the main CPU 45 to the medium detecting circuit 85 and the RTC 87 are at least partially formed by a common line such that the status of attachment/detachment of the storage medium 71 is monitored by the medium detecting circuit 85 made operable by the backup power supply 83 even when electric power is not supplied to the main CPU 45 due to turn-off of the power supply 89, and the status of attachment/detachment of the storage medium 71 is monitored with reduced power consumption. Further, when it is determined from the result of the monitoring that the storage medium 71 was not removed during the power-off, the main CPU reads out file management information from the ROM 7 or the RAM 17 and executes the start-up process, whereas when it is determined that the storage medium 71 was removed from the connector 97 at least once, the main CPU 45 reads out file management information from the storage medium 71 and executes the start-up process. As a result, it becomes unnecessary to provide a plurality of CPUs in the digital camera as in the conventional ones, which contributes to reduction of the cost of the digital camera. Further, since the signal lines are at least partially formed by a common line, it is possible not only to simplify the circuit configuration, but also to make it unnecessary to check the attachment/detachment history information of the storage medium each time the digital camera is started, thereby reducing start-up time.

The ninth embodiment of the present invention is distinguished from the above-described eighth embodiment in that the signal line for serial communication between the main CPU 45 and the medium detecting circuit 85 and the signal line for serial communication between the main CPU 45 and the RTC 87 are provided separately from each other. The other elements in the present embodiment are identical to the corresponding ones in the eighth embodiment (FIGS. 1A, 1B and 14), and therefore description thereof is omitted.

Figure 15:
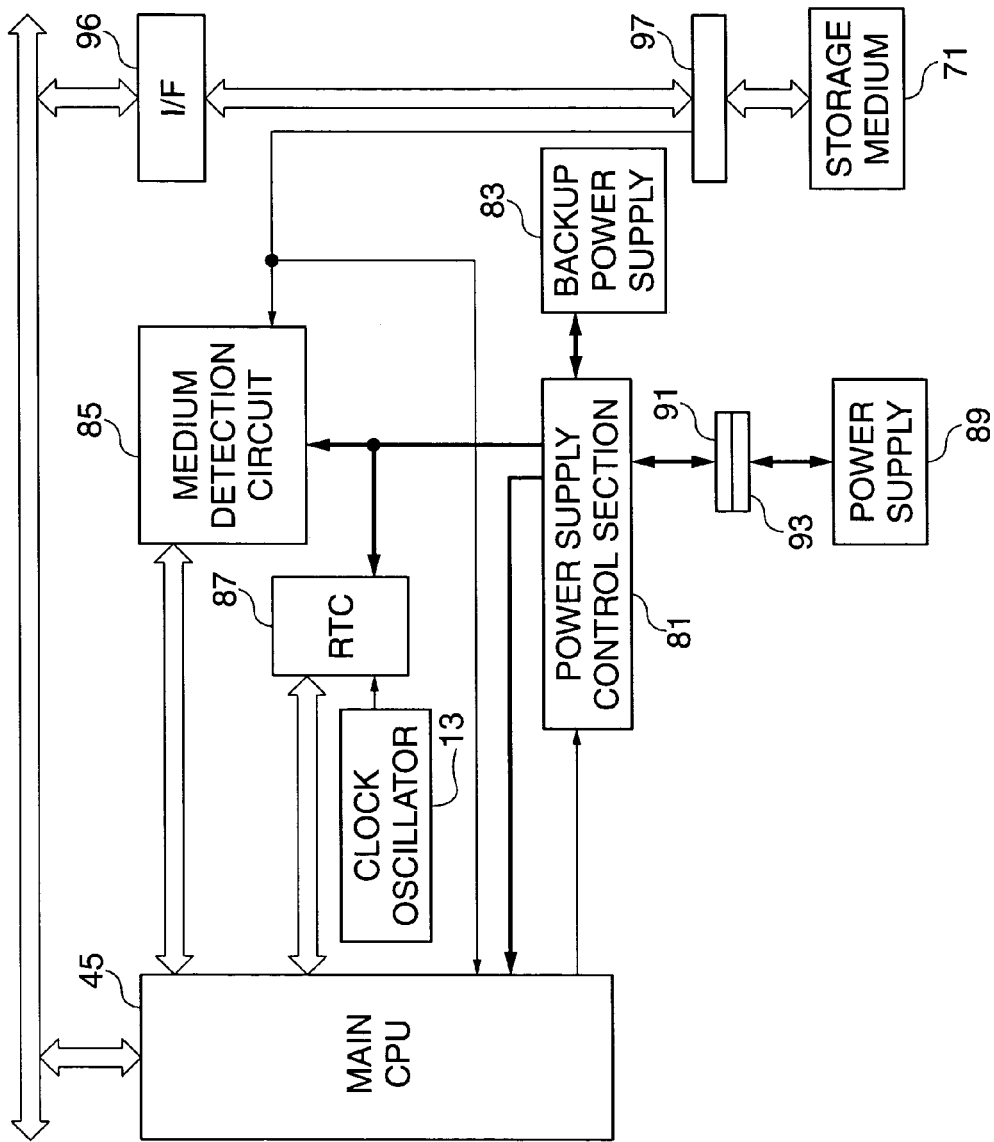
FIG. 15 is a block diagram showing part of the configuration of a digital camera as an electronic apparatus according to a ninth embodiment of the present invention, in particular, a main CPU, a medium detecting circuit, a RTC, and a power supply system thereof.

FIG. 15 is a block diagram showing part of the configuration of a digital camera as an electronic apparatus according to the ninth embodiment, in particular, the main CPU 45, the medium detecting circuit 85, the RTC 87, and the power supply system.

As shown in FIG. 15, the medium detecting circuit 85 is connected to the main CPU 45 for serial communication so as to allow the main CPU 45 to access the medium detecting circuit 85. Further, the RTC 87 is connected to the main CPU 45 for serial communication so as to allow the main CPU 45 to access the RTC 87. In short, the signal lines connecting the main CPU 45 to the medium detecting circuit 85 and the RTC 87 for serial communication are made separate from each other. A medium attachment/detachment monitoring process and various processes including a start-up process executed based on a monitoring result are identical to those in the eighth embodiment.

As described above, according to the present embodiment, since the signal lines connecting the main CPU 45 to the medium detecting circuit 85 and the RTC 87 for serial communication are made separate from each other, the main CPU 45 can control the storage medium attachment/detachment detecting function of the medium detecting circuit 85 and the time managing function of the RTC 87 independently of each other.

The tenth embodiment of the present invention is distinguished from the eighth embodiment in that a medium detecting circuit 1001 is incorporated in the RTC 87, and a temporary storage section (or a register) of the RTC 87 also functions as a register of the medium detecting circuit 1001, for storing the detected status of attachment/detachment of the storage medium. The other elements in the present embodiment are identical to the corresponding ones in the eighth embodiment (FIGS. 1A, 1B and 14), and therefore description thereof is omitted.

Figure 16:
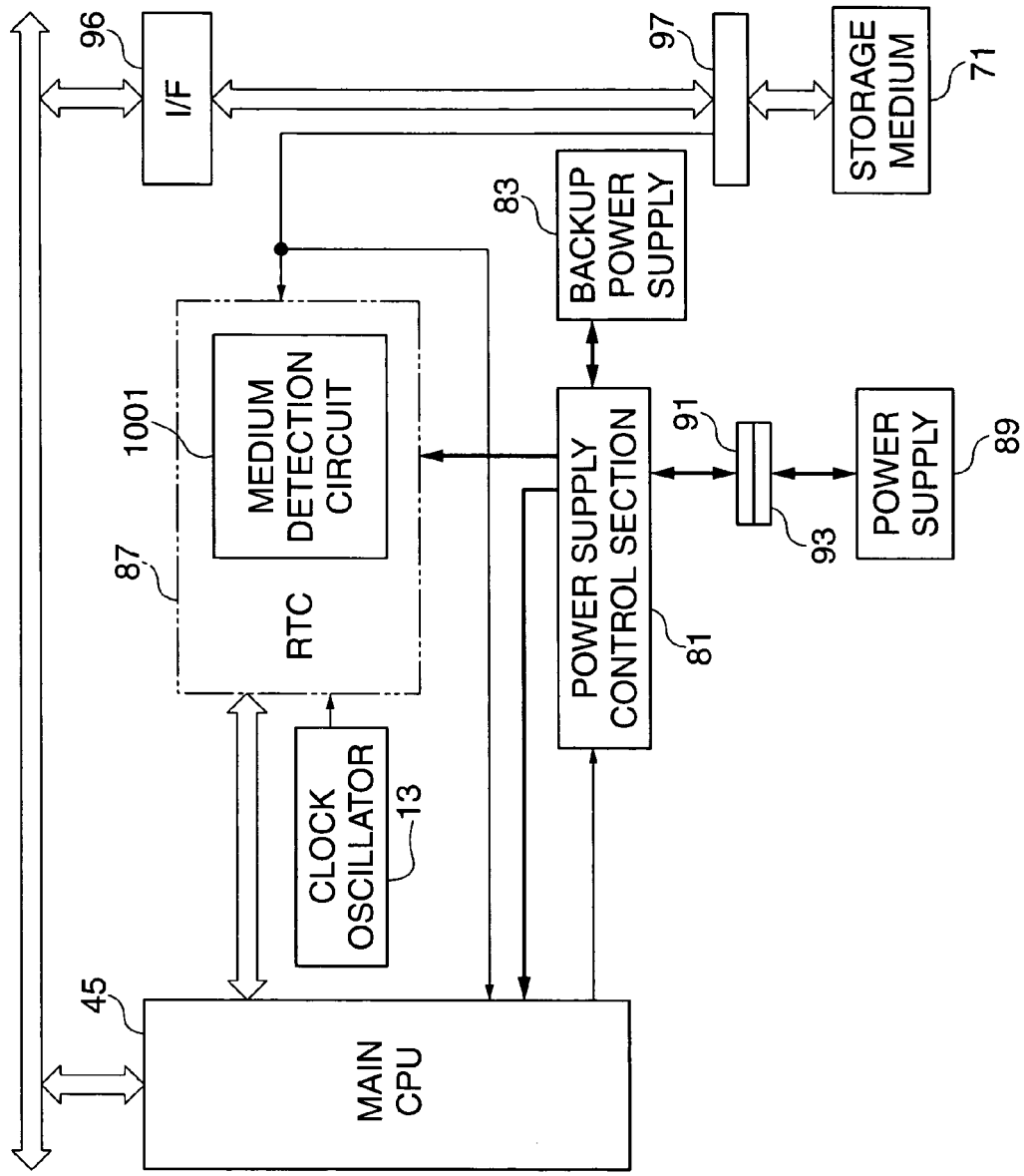
FIG. 16 is a block diagram showing part of the configuration of a digital camera as an electronic apparatus according to a tenth embodiment of the present invention, in particular, a main CPU, a medium detecting circuit, a RTC, and a power supply system thereof.

FIG. 16 is a block diagram showing part of the configuration of a digital camera as an electronic apparatus according to the present embodiment, in particular, the main CPU 45, the medium detecting circuit 1001, the RTC 87, and the power supply system.

As shown in FIG. 16, the RTC 87 is connected to the power supply controller 81 such that electric power is supplied to the RTC 87 from the backup power supply 83 by control of the power supply controller 81 even when the power supply 89 is in its OFF state, and the main CPU can read out time from a time management circuit, not shown, incorporated in the RTC 87, through serial communication. Since the medium detecting circuit 1001 and the time management circuit are both incorporated in the RTC 87, electric power is supplied to the medium detecting circuit 1001 and the time management circuit from the backup power supply 83 by control of the power supply controller 81 even in the OFF state of the power supply 89.

The medium detecting circuit 1001 detects the status of attachment/detachment of the storage medium 71 to and from the connector 97 based on the medium detection signal. The medium detecting circuit 1001 stores data indicative of the detected status of attachment/detachment of the storage medium 71 to and from the connector 97 in the temporary storage section (or the register) of at least one bit within the RTC 87.

As described above, according to the present embodiment, the medium detecting circuit 1001 is incorporated in the RTC 87, and the RTC 87 is configured to have the temporary storage section (or the register) also functioning as a register of the medium detecting circuit 1001, for storing data indicative of the detected storage medium attachment/detachment status, as described above, so that the RTC 87 and the medium detecting circuit 1001 can share the power supply line from the power supply controller 81, the signal line for serial communication with the main CPU 45, and the storage means. Thus, simplification of the circuit configuration, space-saving of the mounting area, and reduction of the mounting cost can be achieved.

The eleventh embodiment of the present invention is distinguished from the eighth embodiment in that a diode 1011 is inserted in the signal line connecting between the connector 97 and the main CPU 45. The other elements in the present embodiment are identical to the corresponding ones in the eighth embodiment (FIGS. 1A, 1B and 14), and therefore description thereof is omitted.

Figure 17:
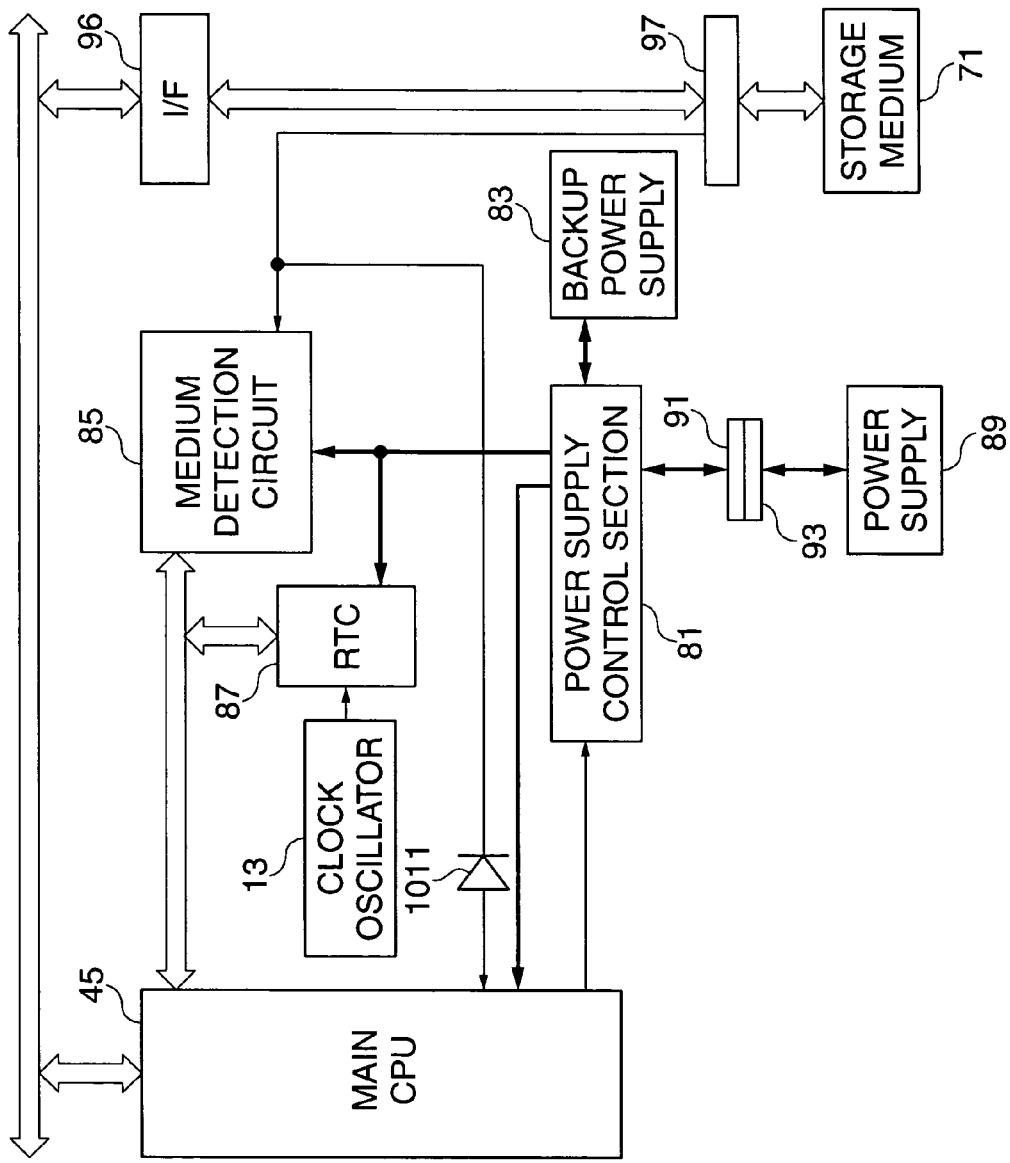
FIG. 17 is a block diagram showing part of the configuration of a digital camera as an electronic apparatus according to an eleventh embodiment of the present invention, in particular, a main CPU, a medium detecting circuit, a RTC, and a power supply system thereof.

FIG. 17 is a block diagram showing part of the configuration of a digital camera as an electronic apparatus according to the present embodiment, in particular, the main CPU 45, the medium detecting circuit 85, the RTC 87, and the power supply system.

As shown in FIG. 17, the medium detection signal for detecting attachment/detachment of the storage medium 71 to and from the connector 97 is input from the connector 97 not only to the medium detecting circuit 85 but also to the main CPU 45. The signal line connecting between the connector 97 and the medium detecting circuit 85 and the signal line connecting between the connector 97 and the main CPU 45 are partially formed by a common signal line. Further, the diode 1011 is inserted in the signal line connecting between the connector 97 and the main CPU 45.

Normally, when the power supply 89 is on, the status of attachment/detachment of the storage medium 71 is detected by the main CPU 45. At this time, the medium detecting circuit 85 is supplied with electric power from the power supply 89 similarly to the main CPU 45, so that the medium detection signal can be input to the medium detecting circuit 85 without any problem.

On the other hand, when the power supply 89 is off, the power of the main CPU 45 is turned off, and the status of attachment/detachment of the storage medium 71 is monitored by the medium detecting circuit 85 operable by the backup power supply 83. In this case, since the signal line for the medium detection signal is at least partially shared between the main CPU 45 and the medium detecting circuit 85, the medium detection signal can be input to the port of the main CPU 45 in the power-off state, causing electric current to flow into the main CPU 45.

To eliminate this inconvenience, the diode 1011 is inserted at a predetermined location in the signal line connecting between the connector 97 and the main CPU 45, to prevent electric current from flowing into the main CPU 45 in the power-off state and at the same time allow the electric current to flow into the medium detecting circuit 85.

As described above, according to the present embodiment, since the diode 1011 is inserted in the signal line connecting between the connector 97 and the main CPU 45, it is possible to prevent electric current from flowing into the main CPU 45 in the power-off state. Thus, the power of the main CPU 45 can be turned on/off independently of the power of the medium detecting circuit 85. More specifically, since electric power is supplied to the medium detecting circuit 85 from the backup power supply 83 in a state where the power of the main CPU 45 is kept off for power saving, the medium detecting circuit 85 can detect the status of attachment/detachment of the storage medium 71.

The twelfth embodiment of the present invention is distinguished from the eighth embodiment in that a power supply voltage detecting circuit 1021 is added to the medium detecting circuit 85. The other elements in the present embodiment are identical to the corresponding ones in the eighth embodiment (FIGS. 1A, 1B and 14), and therefore description thereof is omitted.

Figure 18:
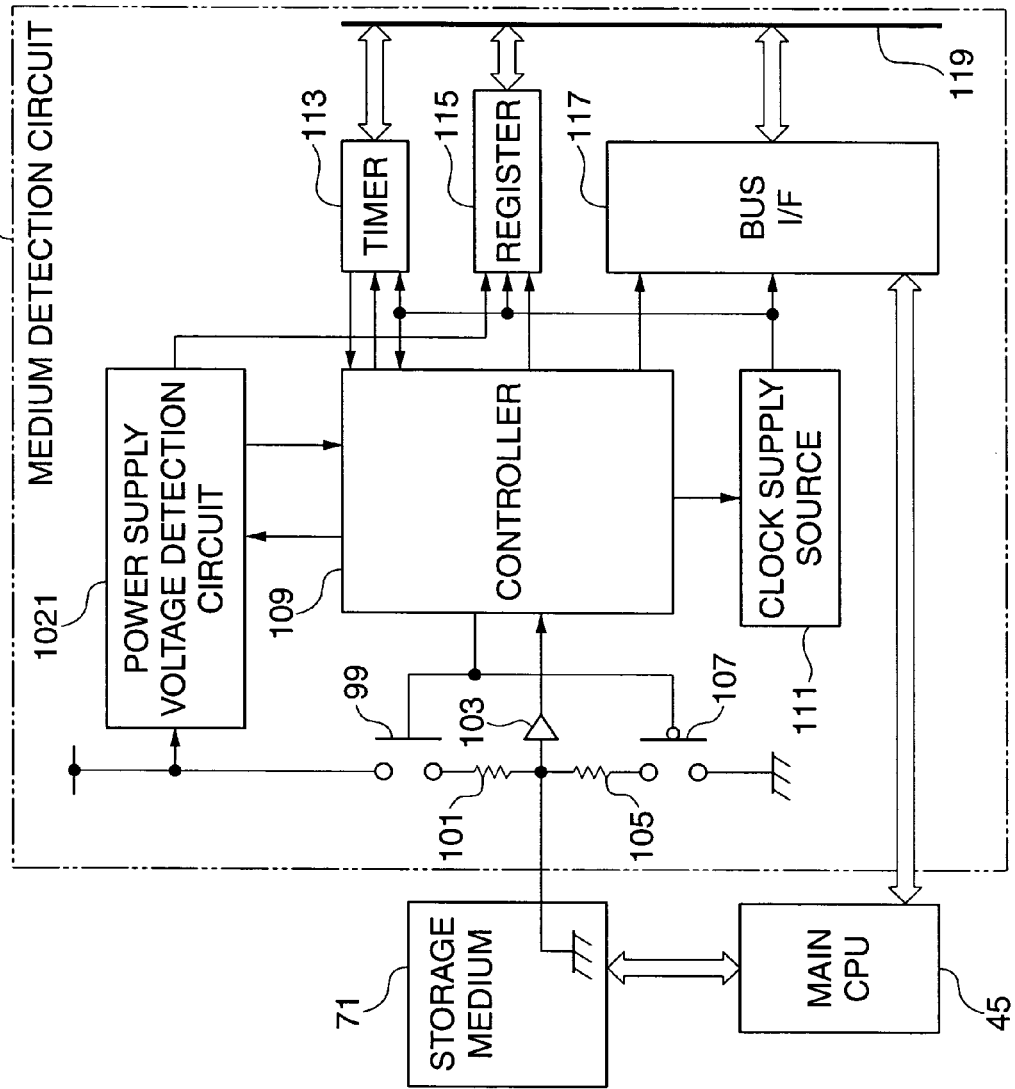
FIG. 18 is a block diagram showing the configuration of a medium detecting circuit of a digital camera as an electronic apparatus according to a twelfth embodiment of the present invention.

FIG. 18 is a block diagram showing the configuration of the medium detecting circuit 85 of the digital camera as an electronic apparatus according to the twelfth embodiment.

As shown in FIG. 18, the power supply voltage detecting circuit 1021 is provided in the medium detecting circuit 85 which is configured similarly to that shown in FIG. 14. The power supply voltage detecting circuit 1021 detects the voltage of electric power supplied to the medium detecting circuit 85. The power supply voltage detecting circuit 1021 is controlled by the controller 109. The controller 109 compares the voltage detected by the power supply voltage detecting circuit 1021 with an operational threshold voltage (operation stop voltage) for the medium detecting circuit 85 stored in the register 115, and stops the operation of the medium detecting circuit 85 when the detected voltage is lower than the operational threshold voltage. The operational threshold voltage stored in the register 115 can be changed and set as desired. Further, the RTC 87 is also provided with a power supply voltage detecting circuit similar to the power supply voltage detecting circuit 1021, and a register for storing the changeable operational threshold voltage value.

This configuration makes it possible to set different operational threshold voltages, respectively, for the medium detecting circuit 85 and the RTC 87 sharing the same backup power supply 83. As a result, the effective use of the relatively small-capacity backup power supply 83 can be achieved. For example, when the charge or remaining capacity of the backup power supply 83 has decreased, it is possible to select whether priority should be given to the clock function of the RTC 87 or to the storage medium attachment/detachment detecting function of the medium detecting circuit 85.

When priority is given to the clock function of the RTC 87, the operational threshold voltage for the medium detecting circuit 85 is set higher than the operational threshold voltage for the RTC 87, and when the voltage of the backup power supply 83 falls to the set voltage, the monitoring operation of the medium detecting circuit 85 is stopped by control of the controller 109 to thereby stop the storage medium attachment/detachment detecting function. This makes it possible to prolong the service life of the clock function.

On the other hand, when priority is given to the storage medium attachment/detachment detecting function of the medium detecting circuit 85, the operational threshold voltage for the RTC 87 is set higher than the operational threshold voltage for the medium detecting circuit 85, and when the voltage of the backup power supply 83 falls to the set voltage, the operation of the RTC 87 is stopped by control of the controller 109 to thereby stop the clock function. This makes it possible to prolong the service life of the storage medium attachment/detachment detecting function.

As described above, according to the present embodiment, when the charge or remaining capacity of the backup power supply 83 has decreased, it is possible to select whether priority should be given to the clock function of the RTC 87 or to the storage medium attachment/detachment detecting function of the medium detecting circuit 85, based on a determination as to which function is to have its life prolonged.

In the above-described twelfth embodiment, whether priority should be given to the clock function of the RTC 87 or to the storage medium attachment/detachment detecting function of the medium detecting circuit 85 can be selected. In this case, for example, it is possible to employ a method in which options for selecting to which of the clock function and the storage medium attachment/detachment detecting function priority should be given are displayed on the display section or the like to thereby enable the user to select a desired one therefrom.

The thirteenth embodiment of the present invention is distinguished from the eighth embodiment in that the buffer 103 is omitted from the medium detecting circuit 85, and a low voltage monitoring circuit (UVLO) 2003 is added to the same. The other elements in the present embodiment are identical to the corresponding ones in the eighth embodiment (FIGS. 1A, 1B and 14), and therefore description thereof is omitted.

Figure 19:
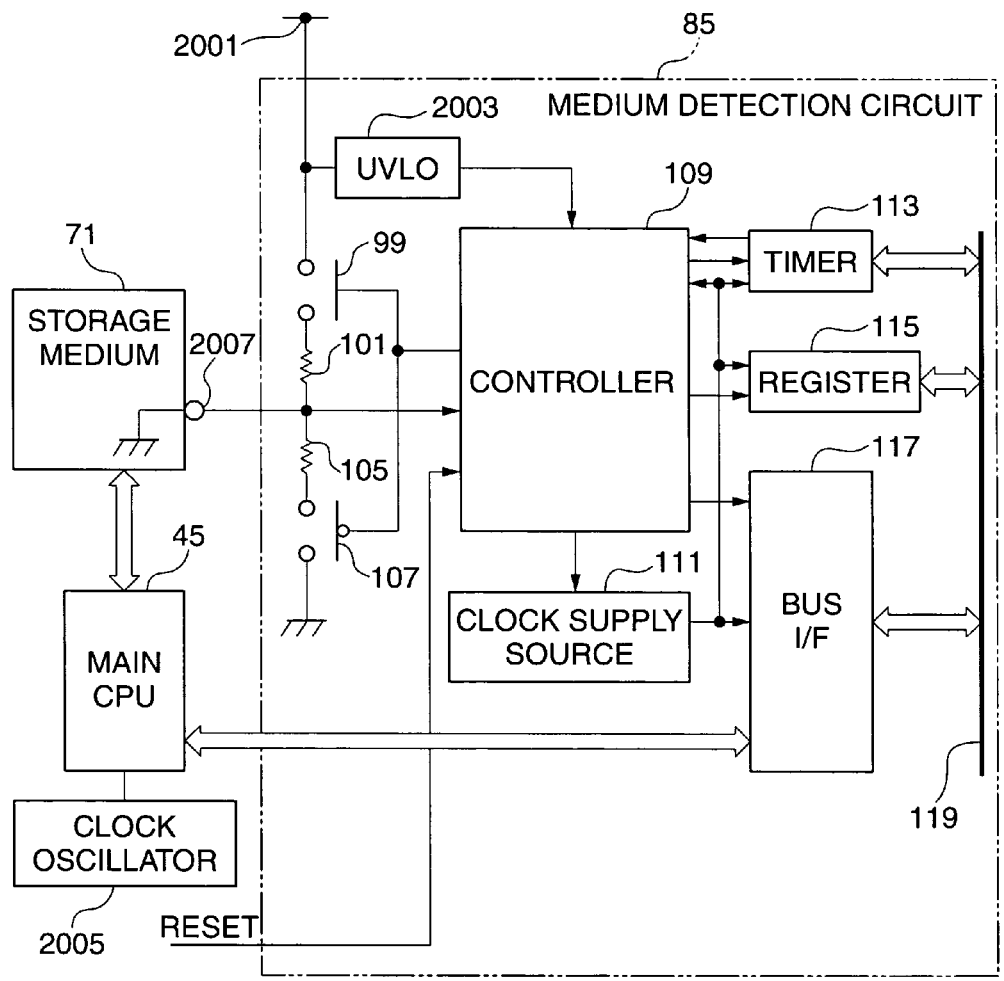
FIG. 19 is a block diagram showing the configuration of a medium detecting circuit of a digital camera as an electronic apparatus according to a thirteenth embodiment of the present invention.

FIG. 19 is a block diagram showing the configuration of the medium detecting circuit 85 of the digital camera as an electronic apparatus according to the thirteenth embodiment.

A power supply 2001 appearing in FIG. 19 is for supplying electric power to the medium detecting circuit 85, and corresponds to the backup power supply 83 appearing in FIG. 1B. The low voltage monitoring circuit 2003 is provided in the medium detecting circuit 85 which is configured similarly to that in FIG. 14, for monitoring a voltage supplied to the medium detecting circuit 85 by comparing the voltage with a predetermined set voltage. A clock oscillator 2005 supplies a clock signal to the main CPU 45.

An insertion/removal-detecting terminal 2007 provided at the connector 97, for detecting attachment/detachment of the storage medium 71 is constantly connected to ground in the storage medium 71 after the storage medium 71 is attached. Consequently, when the pull-up switch 99 is turned on in this state, voltage is supplied from the power supply 2001 to the controller 109 of the medium detecting circuit 85 via the pull-up resistor 101, whereby the insertion/removal-detecting terminal 2007 is supplied with voltage.

That is, when the storage medium 71 is attached to the connector 97, the signal line for the medium detection signal is connected to ground via the insertion/removal-detecting terminal 2007, and hence the controller 109 detects a GND-level medium detection signal, i.e. a low-level medium detection signal. The controller 109 detects, based on the low-level medium detection signal, that the storage medium 71 is attached to the connector 97, and stores the information in the register 115 as the detected status of attachment/detachment of the storage medium 71.

On the other hand, when the storage medium 71 is not attached to the connector 97, the insertion/removal-detecting terminal 2007 of the storage medium 71 is constantly connected to the GND in the storage medium 71. Consequently, when the pull-up switch 99 is turned on, voltage is supplied from the power supply 2001 to the signal line for the medium detection signal via the pull-up resistor 101, whereby the insertion/removal-detecting terminal 2007 is supplied with voltage. When the storage medium 71 is not attached to the connector 97, the circuit including the signal line is opened at the insertion/removal-detecting terminal 2007, and hence the controller 109 detects a power supply-level (VCC-level) medium detection signal, i.e. a high-level medium detection signal.

The clock oscillator 111 operates with a sufficiently lower frequency than the clock oscillator 2005. Therefore, when the main CPU 45 is operative, the power consumption of the main unit of the digital camera is normal. On the other hand, when supply of electric power to the main CPU 45 is suspended due to stoppage of the main CPU 45, the operation of the main unit is carried out in response only to a clock signal generated by the clock oscillator 111 for operation of the controller 109, so that the digital camera can operate with a smaller power consumption than it normally does. When the main CPU 45 is not supplied with electric power or when a sequence of operations involving the operation of the clock oscillator 2005 are suspended, the digital camera is operated only by the medium detecting circuit 85 for detecting the status of attachment/detachment of the storage medium 71.

The controller 109 is controlled in respect of time by the timer 113, to operate in a predetermined cycle. In this case, particularly, a time period over which the pull-up switch 99 is kept on, a time period over which the pull-up switch 99 is kept off, and a duty ratio between the ON time period and the OFF time period are controlled by the timer 113 such that the pull-up switch 99 is periodically turned on and off.

In controlling the time period over which the pull-up switch 99 is kept on using the timer 113 (in other words, when the detected state of attachment/detachment of the storage medium 71 is stored in the register 115), if the controller 109 detects a change from the GND level=LOW to the VCC level=HIGH in the detection signal due to disconnection between the insertion/removal-detecting terminal 2007 and the connector 97, it stores in a predetermined area of the register 115 information indicating that the storage medium 71 is in the state removed from the connector 97. Thereafter, the controller 109 controls the timer 113 to stop ON time control of the pull-up switch 99. As a result, the pull-up switch 99 is held in the OFF state, and the pull-down switch 107 is held in the ON state.

When the main CPU 45 can communicate with the medium detecting circuit 85, the main CPU 45 can access the register 115 via the bus interface 117 to thereby acquire information indicative of the detected status of attachment/detachment (attachment/detachment history) of the storage medium 71 from the register 115. When the storage medium 71 is removed from the connector 97, information indicative of the removed state of the storage medium 71 is stored in the register 115 of the controller 109, and the main CPU 45 can update the information stored in the register 115, as required, to information indicating that the storage medium 71 is in a state inserted in the connector 97.

The low voltage monitoring circuit 2003 monitors the voltage of the power supply 2001 for the medium detecting circuit 85 to detect a low voltage whose value is higher than the lower limit value of the voltage at which the medium detecting circuit 85 is operable, and sends a low voltage detection signal to the controller 109. When receiving the low voltage detection signal, the controller 109 stores information indicative of the fact that the storage medium 71 was removed at least once, in the register 115 irrespective of whether the storage medium 71 is attached to or detached from the connector 97 thereafter.

Thus, when the voltage of the power supply 2001 has become such a low voltage at which the medium detecting circuit 85 is inoperative and detection of the status of attachment/detachment of the storage medium 71 by the medium detecting circuit 85 is disabled, the information stored in the register 115 can be fixed to that indicative of the fact that the storage medium 71 was removed at least once.

When a reset signal is sent to the controller 109 via the insertion/removal-detecting terminal 2007 of the storage medium 71, the controller 109 also stores information indicative of the fact that the storage medium 71 was removed at least once, in the register 115 irrespective of whether the storage medium 71 is attached to or detached from the connector 97 thereafter.

Thus, when the reset signal is input to the medium detecting circuit 85 from the outside, the information stored in the register 115 can be fixed to that indicative of the fact that the storage medium 71 was removed at least once, irrespective of whether the storage medium 71 is inserted in the connector 97 or removed from the same thereafter.

Further, the main CPU 45 executes a start-up process based on the information indicative of the fact that the storage medium 71 was removed at least once, which is stored in the register 115.

As described above, according to the present embodiment, when the voltage of the power supply 2001 has become such a low voltage at which the medium detecting circuit 85 becomes inoperative, or when the reset signal is input to the medium detecting circuit 85 from the outside, information stored in the register 115 is fixed to that indicative of the fact that the storage medium 71 was removed at least once, irrespective of whether the storage medium 71 is attached to or detached from the connector 97 thereafter. Further, the main CPU 45 executes the start-up process based on the information indicative of the fact that the storage medium 71 was removed at least once, which is stored in the register 115. Thus, it is possible to obviate the necessity of checking the storage medium each time the digital camera is restarted, as in the conventional digital camera.

The fourteenth embodiment of the present invention is distinguished from the above-described thirteenth embodiment in that a logic circuit 2008 for performing a logical OR operation between the low voltage detection signal sent from the low voltage monitoring circuit 2003 and the reset signal sent via the insertion/removal-detecting terminal 2007 is additionally provided on the output side of the low voltage monitoring circuit 2003. The other elements in the present embodiment are identical to the corresponding ones in the thirteenth embodiment (FIG. 19), and therefore description thereof is omitted.

Figure 20:
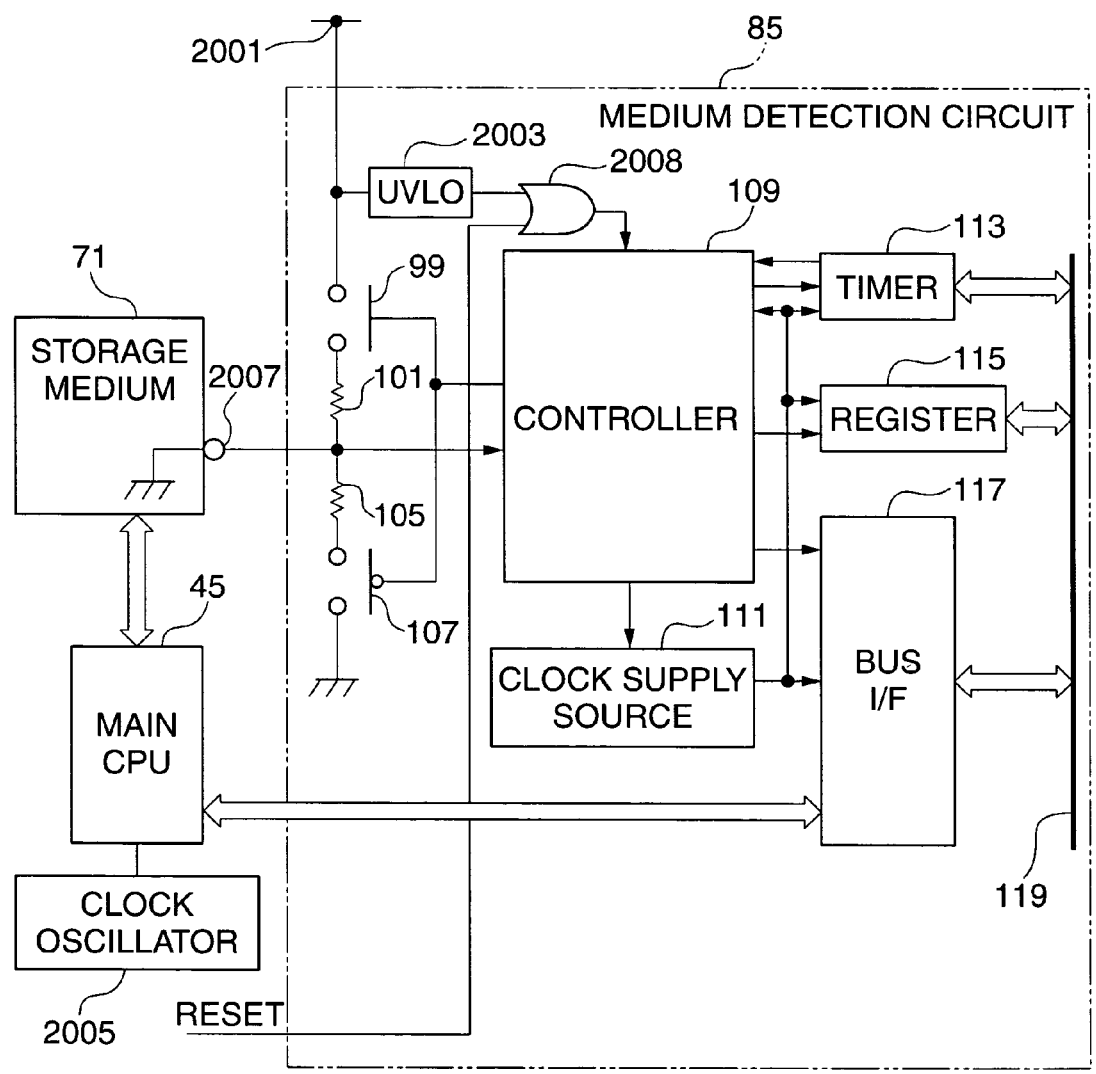
FIG. 20 is a block diagram showing the configuration of a medium detecting circuit of a digital camera as an electronic apparatus according to a fourteenth embodiment of the present invention.

FIG. 20 is a block diagram showing the configuration of the medium detecting circuit 85 of the digital camera as an electronic apparatus according to the fourteenth embodiment.

In FIG. 20, the low voltage monitoring circuit 2003 monitors the voltage of the power supply 2001 for the medium detecting circuit 85 to detect a low voltage whose value is higher than the lower limit value of the voltage at which the medium detecting circuit 85 becomes operative, and sends a low voltage detection signal to the logic circuit 2008. Further, the reset signal sent from the outside via the insertion/removal-detecting terminal 2007 of the storage medium 71 is also sent to the logic circuit 2008. The logic circuit 2008 performs the logical OR operation between the low voltage detection signal and the reset signal to send the obtained logical OR operation result to the controller 109. The other operations are similar to the corresponding ones in the thirteenth embodiment, and therefore description thereof is omitted.

As described above, according to the present embodiment, as in the thirteenth embodiment, when the voltage of the power supply has become such a low voltage at which the medium detecting circuit 85 becomes inoperative, or when the reset signal is input to the medium detecting circuit 85 from the outside, information stored in the register 115 is fixed to that indicative of the fact that the storage medium 71 was removed at least once irrespective of whether the storage medium 71 is attached to or detached from the connector 97 thereafter. Thus, it is possible to obviate the necessity of checking the attachment/detachment history information of the storage medium 71 each time the digital camera is restarted as in the conventional digital camera.

Although in the above-described thirteenth and fourteenth embodiments, the low voltage monitoring circuit 2003 is provided in the medium detecting circuit 85, this is not limitative, but the power supply controller 81 may be configured to have the function of the low voltage monitoring circuit 2003.

The fifteenth embodiment of the present invention is distinguished from the eighth embodiment in that a conversion circuit 3001, a power supply switching circuit 3003, and a conversion circuit 3005 are added to the configuration shown in FIGS. 1A and 1B. The other elements in the present embodiment are identical to the corresponding ones in the eighth embodiment (FIGS. 1A, 1B and 14), and therefore description thereof is omitted.

Figure 21A:
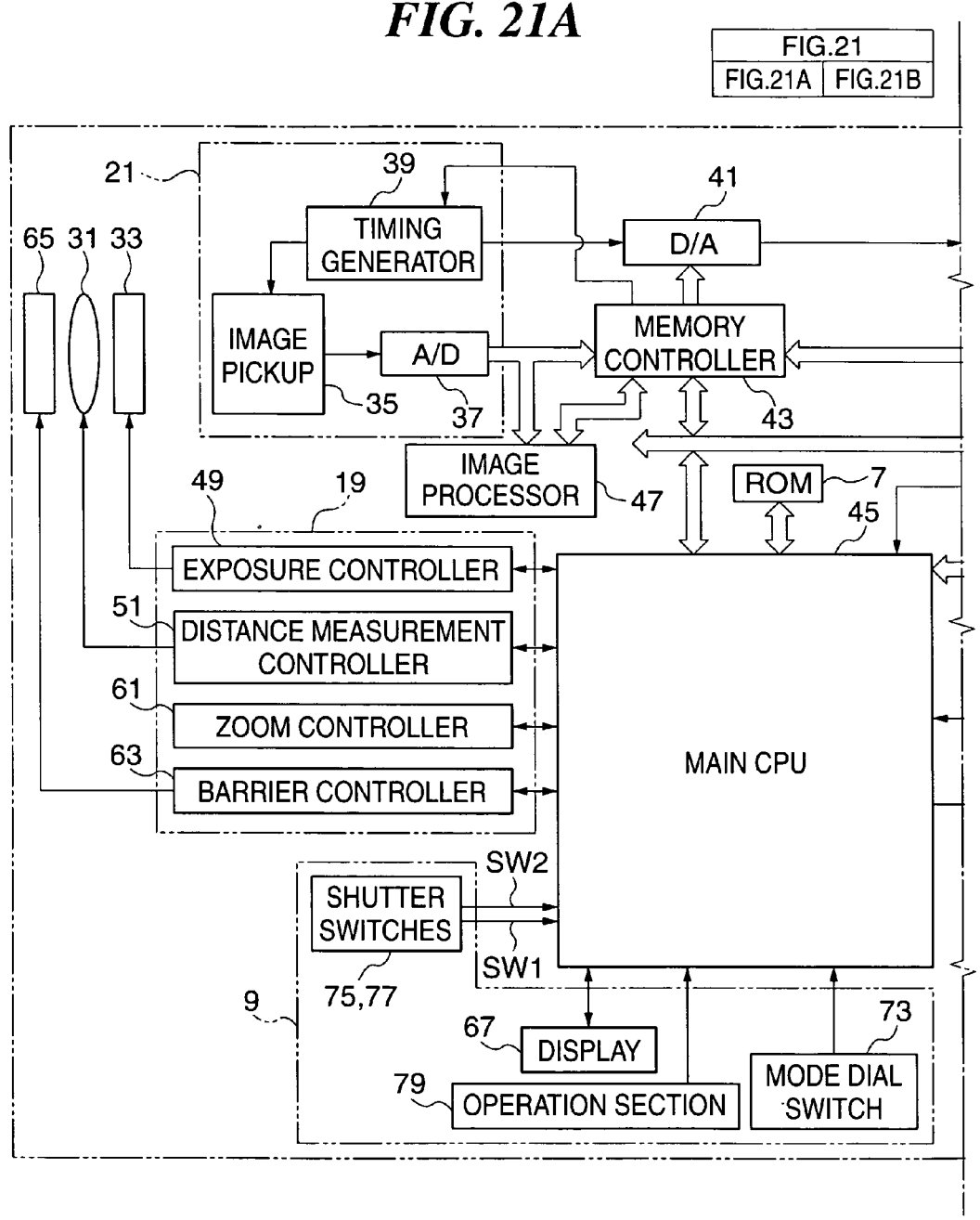
FIGS. 21A and 21B are block diagrams showing the configuration of a digital camera as an electronic apparatus according to a fifteenth embodiment of the present invention.
Figure 21B:
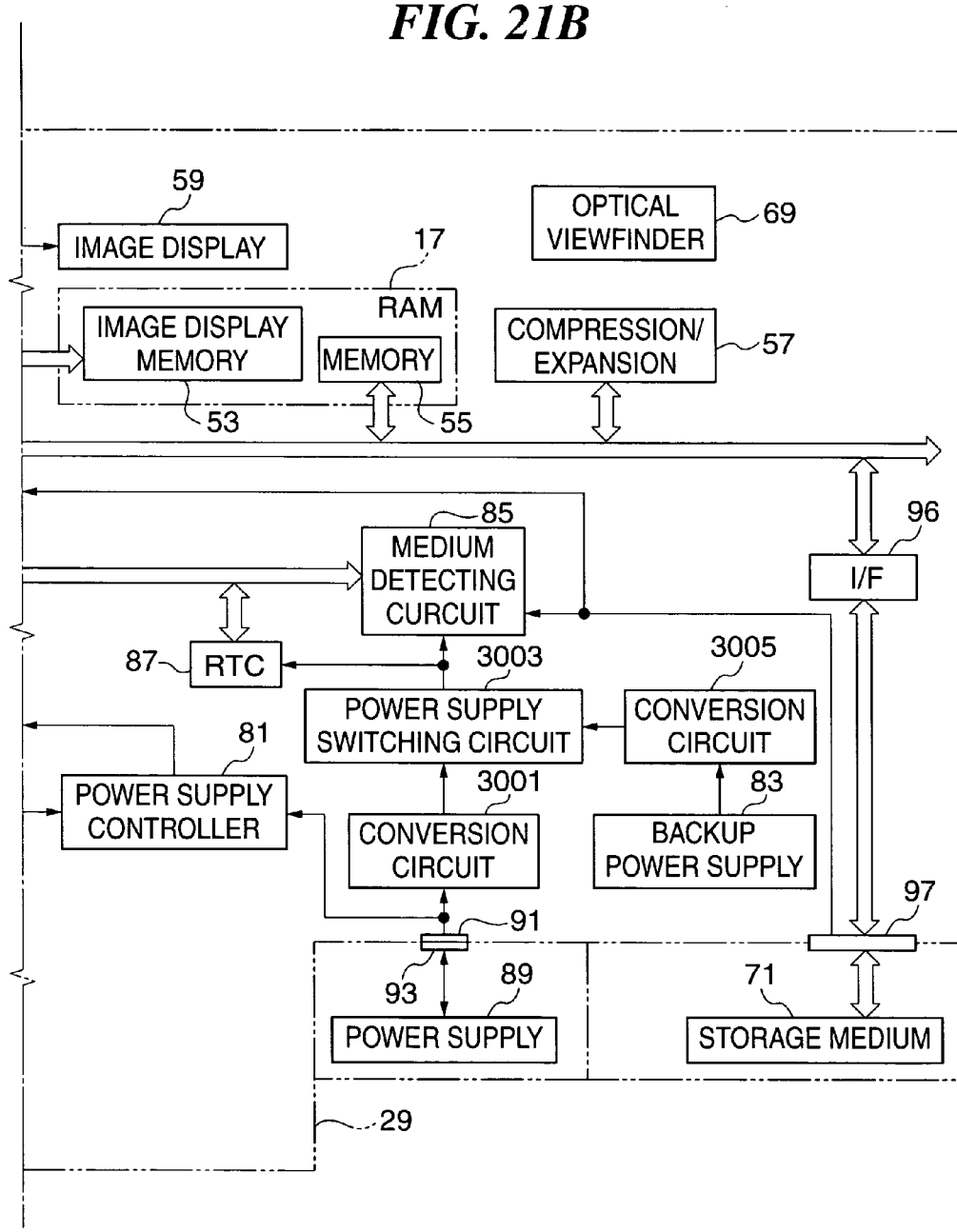

FIGS. 21A and 21B are block diagrams showing the configuration of the digital camera as an electronic apparatus according to the fifteenth embodiment.

In FIG. 21B, the conversion circuit 3001 converts the voltage from the power supply 89 to a voltage suitable for supply to the medium detecting circuit 85 and the RTC 87. The conversion circuit 3001 may be implemented e.g. by a regulator IC from which a required output voltage can be obtained.

The conversion circuit 3005 converts the voltage from the backup power supply 83 to a voltage suitable for supply to the medium detecting circuit 85 and the RTC 87. The conversion circuit 3005 may be implemented e.g. by a regulator IC from which a required output voltage can be obtained. If there is no need to convert the voltage from the backup power supply 83, the voltage from the backup power supply 83 may be directly supplied to the power supply switching circuit 3003.

Figure 23:
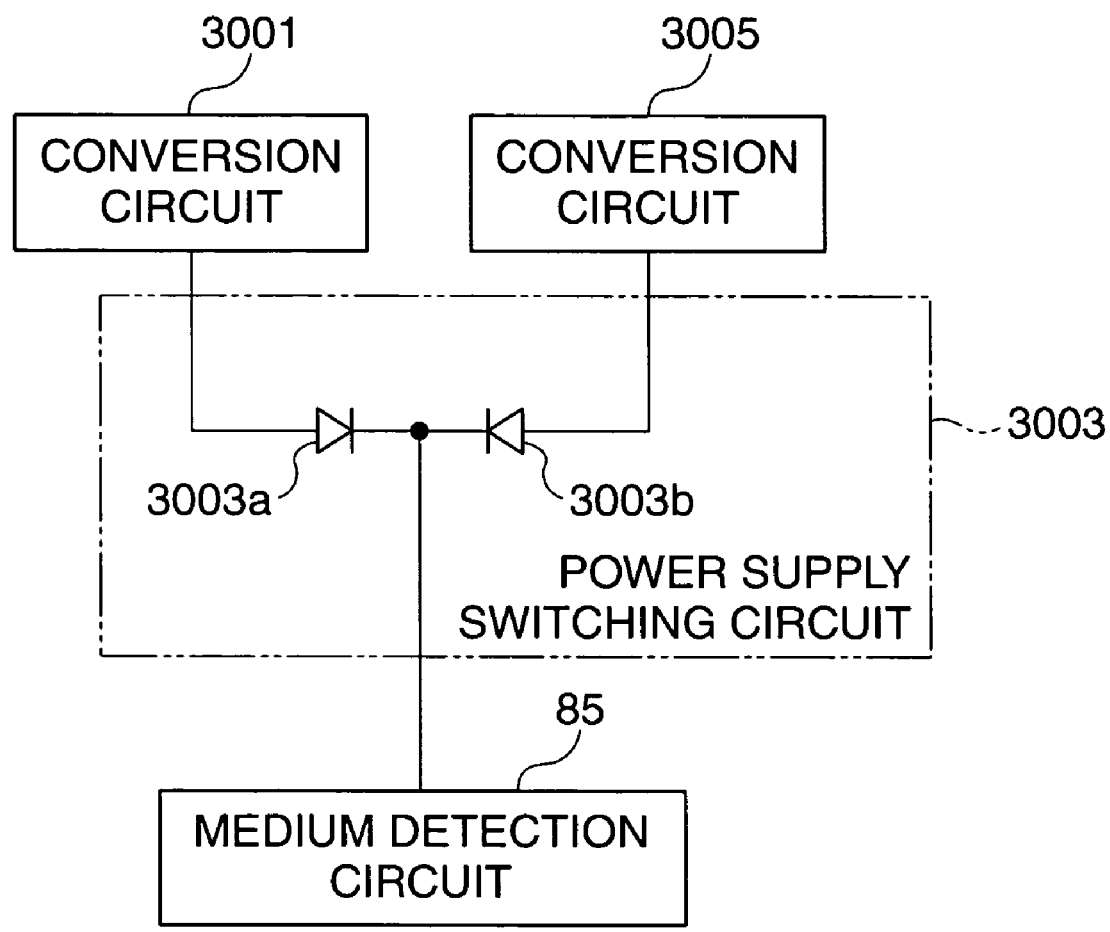
FIG. 23 is a block diagram showing a first example of the configuration of the power supply switching system appearing in FIG. 22.
Figure 24:
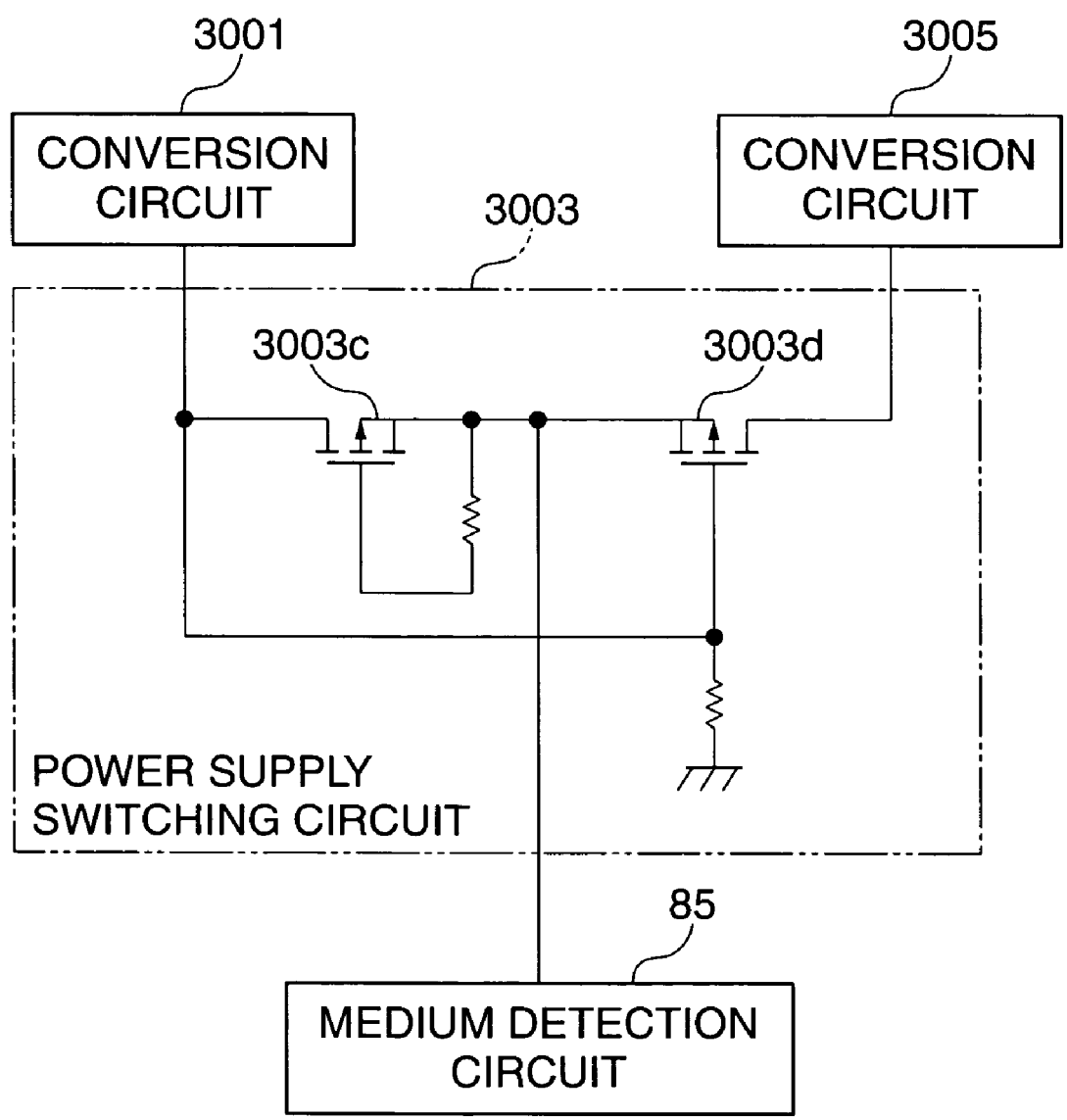
FIG. 24 is a block diagram showing a second example of the configuration of the power supply switching system appearing in FIG. 22.

The power supply switching circuit 3003 switches, as required, between the voltage obtained by conversion by the conversion circuit 3001 and the voltage obtained by conversion by the conversion circuit 3005, to thereby supply a selected voltage to the medium detecting circuit 85 and the RTC 87. For example, when the higher of the respective voltages obtained by the conversions by the conversion circuits 3001 and 3005 is supplied to the medium detecting circuit 85 and the RTC 87, the power supply switching circuit 3003 may be formed by diodes 3003a and 3003b as shown in a first example in FIG. 23. Alternatively, when the voltage from the power supply 99 is preferentially supplied, the power supply switching circuit 3003 may be formed by FET devices 3003c and 3003d as shown in a second example in FIG. 24.

Even when the digital camera is in the OFF state, the conversion circuit 3001, the conversion circuit 3005, and the power supply switching circuit 3003 can supply a sufficient voltage to the medium detecting circuit 85 and the RTC 87 so long as electric power is supplied from the power supply 89 and the backup power supply 83 to components of the main unit 29 of the digital camera, and at the same time the power supply voltage is higher than a voltage required to operate the medium detecting circuit 85 and the RTC 87. Further, when the charge or remaining capacity of the backup power supply 83 has decreased and the voltage therefrom becomes lower than the voltage required to operate the medium detecting circuit 85, electric power is supplied only from the power supply 89.

Figure 22:
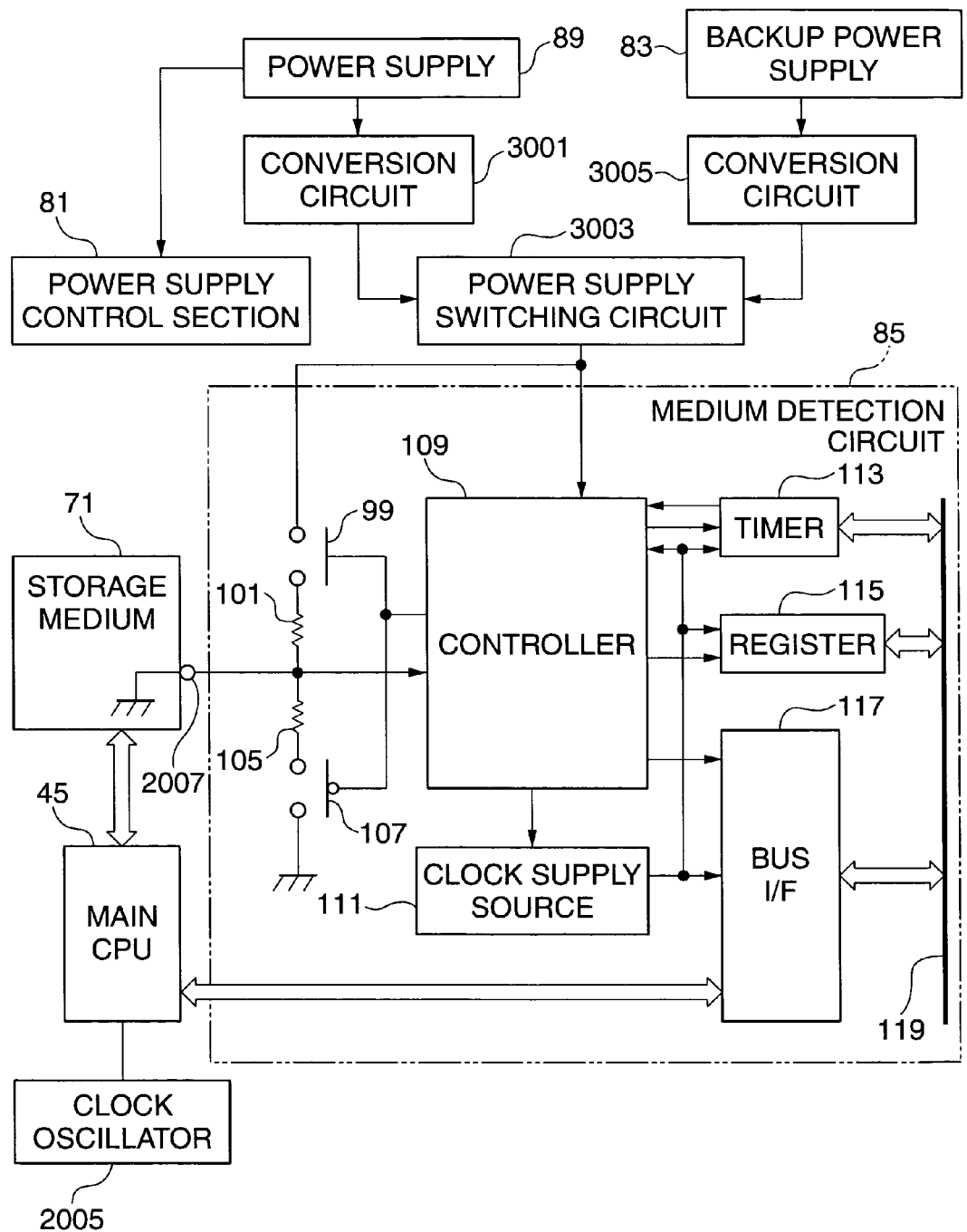
FIG. 22 is a block diagram showing the configuration of a medium detecting circuit and a power supply switching system appearing in FIG. 21B.

FIG. 22 is a block diagram showing the configuration of the medium detecting circuit 85 and a power supply switching system appearing in FIG. 21B.

In FIG. 22, even in a state where electric power is not supplied to the main CPU 45, the medium detecting circuit 85 is supplied with electric power from the power supply 89 via the conversion circuit 3001 and the power supply switching circuit 3003, or from the backup power supply 83 via the conversion circuit 3005 and the power supply switching circuit 3003. Consequently, the status of attachment/detachment of the storage medium 71 to and from the connector 97 can be constantly monitored by the medium detecting circuit 85. The other operations are identical to the corresponding ones in the thirteenth embodiment, and therefore description thereof is omitted.

As described above, according to the present embodiment, even when electric power is not supplied to the main CPU 45, the status of attachment/detachment of the storage medium 71 to and from the connector 97 is detected by the medium detecting circuit 85, and data (attachment/detachment history) indicative of the detected status of attachment/detachment of the storage medium 71 is temporarily stored in the register 115. Therefore, the main CPU 45 can acquire the attachment/detachment history from the register 115 through communications with the medium detecting circuit 85, and can determine its own operation based on the attachment/detachment history when supplied with electric power. As a result, it is possible to shorten a time period over which the digital camera is started up from a power-off state of the main CPU 45 controlling the overall operation of the digital camera in response to the user's power-on operation.

The sixteenth embodiment of the present invention is distinguished from the above-described fifteenth embodiment in that a charge control circuit 3007 is added to the configuration shown in FIG. 22. The other elements in the present embodiment are identical to the corresponding ones in the fifteenth embodiment (FIG. 22), and therefore description thereof is omitted.

Figure 25:
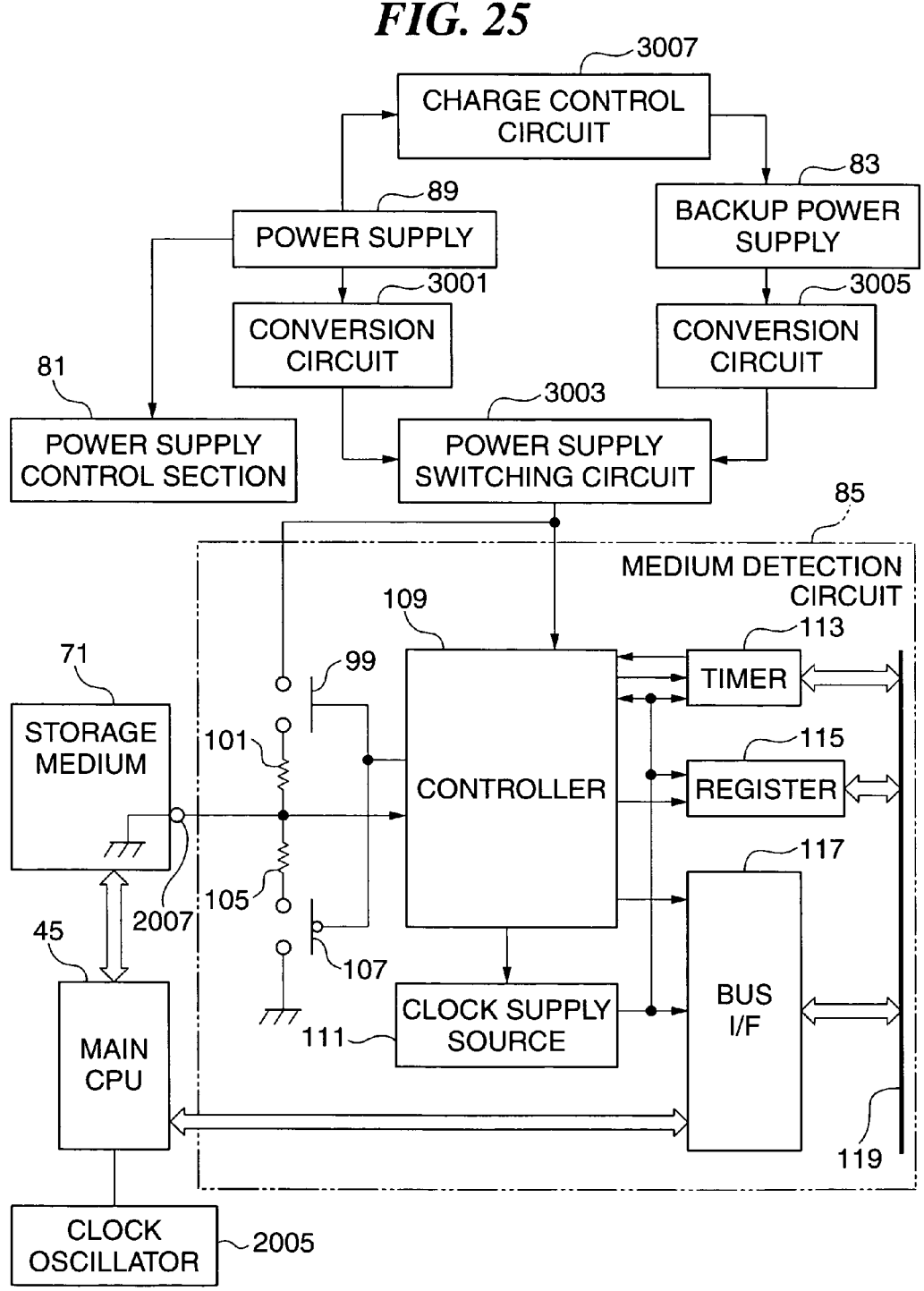
FIG. 25 is a block diagram showing the configuration of a medium detecting circuit and a power supply switching system of a digital camera as an electronic apparatus according to a sixteenth embodiment of the present invention.

FIG. 25 is a block diagram showing the configuration of the medium detecting circuit 85 and the power supply switching system of the digital camera as an electronic apparatus according to the sixteenth embodiment.

As shown in FIG. 25, the charge control circuit 3007 is connected to the power supply 89 and the backup power supply 83. In the fifteenth embodiment, when the charge of the power supply 89 has decreased and the voltage from the power supply 89 becomes lower than the voltage to be supplied to the medium detecting circuit 85, the medium detecting circuit 85 is supplied with electric power only from the power supply 89. For this reason, when the power supply 89 is removed from the main unit 29, detection of the status of attachment/detachment of the storage medium 71 by the medium detecting circuit 85 is disabled.

On the other hand, in the present embodiment, the backup power supply 83 is charged by the power supply 89 via the charge control circuit 3007, and therefore the backup power supply 83 can supply electric power to the medium detecting circuit 85 even when the power supply 89 is removed from the main unit 29, to thereby enable the medium detecting circuit 85 to continuously detect the status of attachment/detachment of the storage medium 71. Further, when the power supply 89 and the backup power supply 83 are loaded in the main unit 29 and the voltage from the conversion circuit 3001 is selected by the power supply switching circuit 3003, the backup power supply 83 is charged by the power supply 89 via the charge control circuit 3007.

Figure 26:
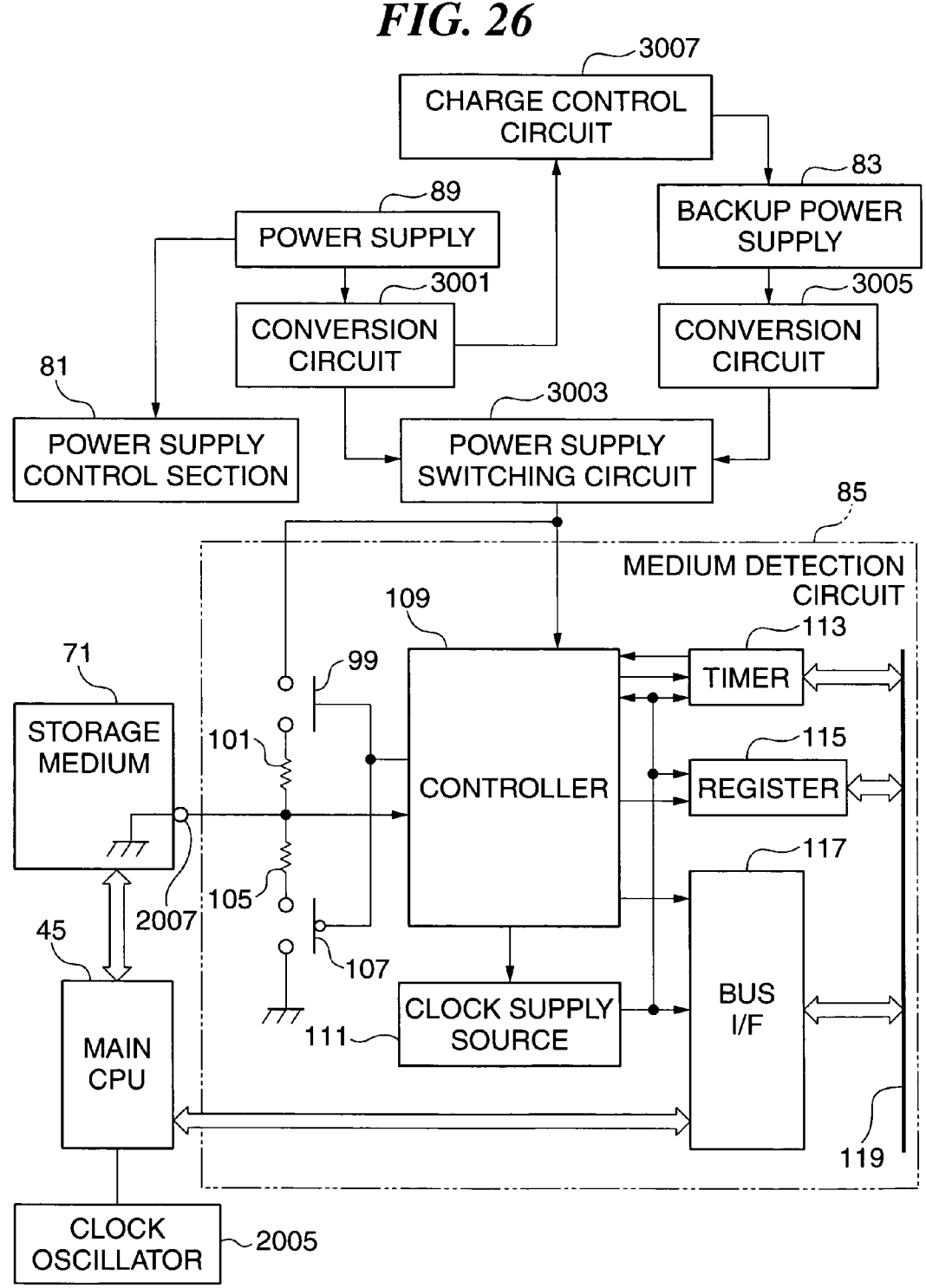
FIG. 26 is a block diagram showing a variation of the configuration of the medium detecting circuit and the power supply switching system in FIG. 25.
Figure 27:
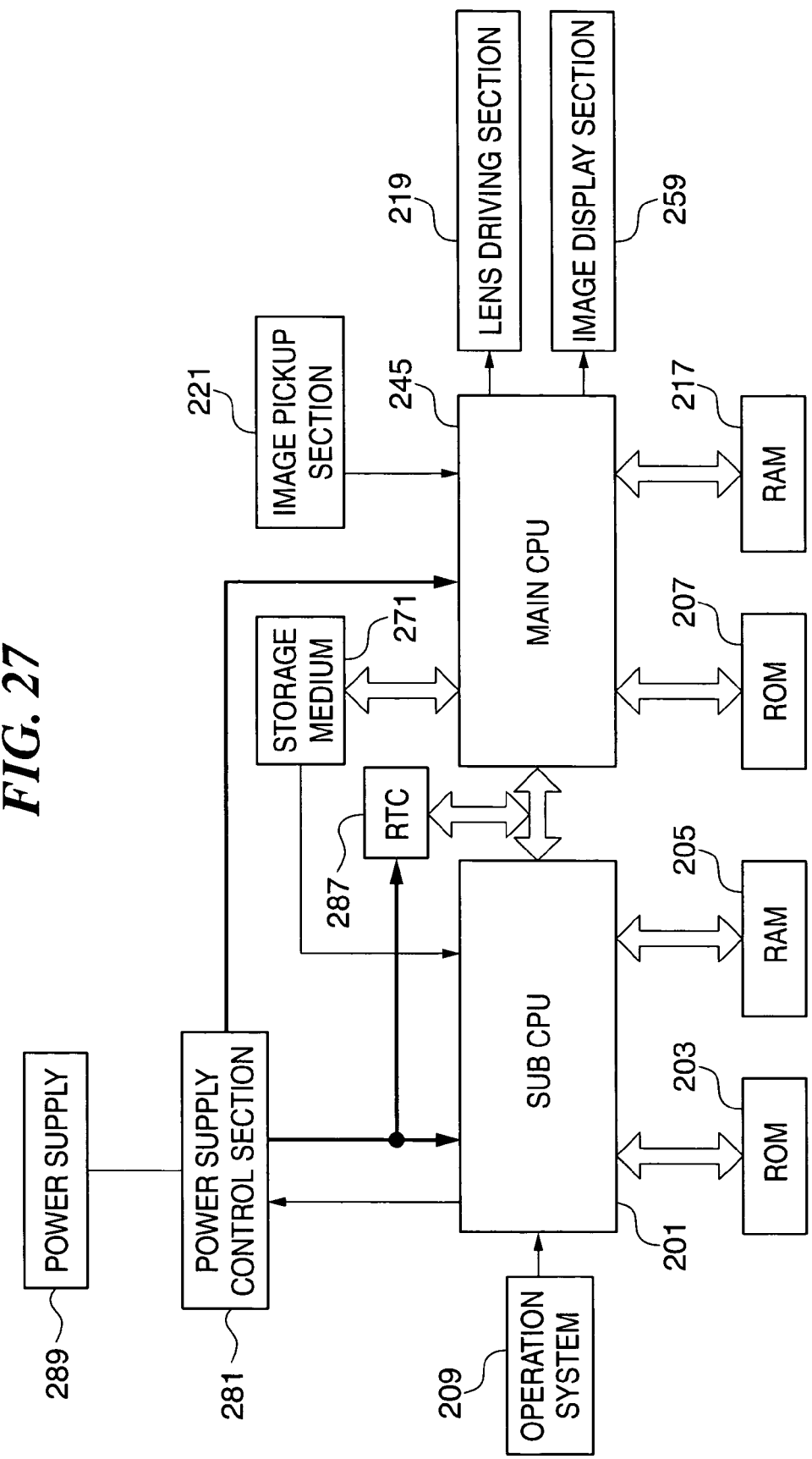
FIG. 27 is a block diagram showing the configuration of a conventional digital camera.

The charge control circuit 3007 can be connected to the conversion circuit 3001 as shown in FIG. 26. Further, when the voltage from the backup power supply 83 is always lower than the output voltage from the conversion circuit 3001, it is possible to form the charge control circuit 3007 only by a resistor.

As described above, according to the present embodiment, the backup power supply 83 is charged by the power supply 89 via the charge control circuit 3007, and therefore, even when the power supply 89 is removed from the main unit 29, the medium detecting circuit 85 is supplied with electric power by the backup power supply 83. As a result, the medium detecting circuit 85 can continuously detect the status of attachment/detachment of the storage medium 71.

Although in each of the above-described first to sixteenth embodiments, the electronic apparatus of the present invention is embodied by a portable digital camera, this is not limitative, but the present invention can be applied to other electronic apparatuses having a configuration which allows attachment and detachment of a storage medium.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Applications Nos. 2004-142322 filed May 12, 2004 and 2004-160147 filed May 28, 2004, which are hereby incorporated by reference herein.

What is claimed is:

1. A digital camera comprising:
a Central Processing Unit (CPU) that controls the digital camera after a start-up process is carried out;
a connection device connectable to a storage medium for storing information;
a monitoring circuit, including a register and a timer, that monitors a connection status of whether the storage medium is connected to or disconnected from the connection device; and
a communication device that enables said CPU to access a monitoring result stored in the register by the monitoring circuit when said CPU is turned ON in response to a user's power-on instruction,
wherein said monitoring circuit monitors the connection status of the storage medium in response to a control signal at a predetermined time interval, which is determined by the timer, stores information of the disconnection in the register when the storage medium is disconnected from said connection device while said CPU is in the OFF state, and, until a user's power-on instruction, maintains said CPU in the OFF state and maintains the register and the timer in the ON state,
wherein said communication device enables said CPU to acquire the information of the disconnection from the register by direct access to the register when said CPU is turned ON in response to the user's power-on instruction, and
wherein said monitoring circuit continues monitoring the connection status of whether the storage medium is connected to or disconnected from the connection device, until the storage medium is disconnected from said connection device, and after the storage medium is disconnected from said connection device, said monitoring circuit stops monitoring the connection status of whether the storage medium is connected to or disconnected from the connection device and continues storing the information of the disconnection in the register to be acquired by direct access of the CPU when said CPU is turned ON.

2. The digital camera as claimed in claim 1, further comprising a time management device that manages time within the digital camera, and
wherein said monitoring circuit and said time management device are configured as a single device.

3. The digital camera as claimed in claim 1, further comprising a management information storage device that stores file management information from the storage medium, and
wherein when said CPU determines, based on the monitoring result stored in said register, that the storage medium has not been disconnected from the connection device, said CPU reads out the file management information from said management information storage device to carry out the start-up process, whereas when said CPU determines that the storage medium has been disconnected from the digital camera at least once, said CPU reads out the file management information from the storage medium to carry out the start-up process.

4. The digital camera as claimed in claim 1, wherein said CPU sets time intervals at which said monitoring circuit monitors the connection status of the storage medium, via said communication device.

5. The digital camera as claimed in claim 1, further comprising a determination device that determines time intervals at which said monitoring circuit monitors the connection status of the storage medium, based on the monitoring result stored in said register.

6. The digital camera as claimed in claim 1, further comprising a fixing device that fixes information stored in said register to information indicative of the storage medium being disconnected from the connecting device regardless of whether or not the storage medium is connected to or disconnected from the connecting device, when a predetermined condition is satisfied, and wherein said CPU carries out the start-up process based on the fixed information.

7. The digital camera as claimed in claim 6, wherein the predetermined condition includes at least one of a condition that a voltage supplied to said monitoring circuit has become equal to or lower than a set voltage or a condition that a reset signal has been externally input to said monitoring circuit.

8. The digital camera as claimed in claim 6, wherein said register stores the information indicative of the storage medium being disconnected from the connecting device as the monitoring result.

9. The digital camera as claimed in claim 1, further comprising:
a first conversion device that converts a voltage from a first power supply, capable of supplying electric power to components of the digital camera, to a first voltage;
a second conversion device that converts a voltage from a second power supply, capable of supplying electric power to said monitoring circuit, including to said register, to a second voltage; and
a switching device that selectively switches between the first voltage and the second voltage to supply a selected one of the first voltage or the second voltage to said monitoring circuit, including said register included in said monitoring circuit.

10. The digital camera as claimed in claim 9, wherein said switching device carries out at least one of a control operation for supplying a higher one of the first voltage or the second voltage, or a control operation for preferentially supplying the first voltage.

11. The digital camera as claimed in claim 9, further comprising a charging device that causes the first power supply to charge the second power supply.

12. The digital camera as claimed in claim 9, further comprising a time management device that manages time within the digital camera, and wherein said monitoring circuit, including said register, and said time management device are operated by common electric power supplied from one of the first power supply or the second power supply.

* * * * *